US011755513B2

(12) United States Patent
Lu

(10) Patent No.: US 11,755,513 B2
(45) Date of Patent: Sep. 12, 2023

(54) DATA PROCESSING AND WRITING METHOD BASED ON VIRTUAL MACHINE MEMORY IDENTIFICATION FIELD AND DEVISE

(71) Applicant: HUAWEI TECHNOLOGIES CO., LTD., Shenzhen (CN)

(72) Inventor: Shengwen Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/323,279

(22) Filed: May 18, 2021

(65) Prior Publication Data

US 2021/0365394 A1 Nov. 25, 2021

(30) Foreign Application Priority Data

May 19, 2020 (CN) ........................ 202010427381.7
Aug. 27, 2020 (CN) ........................ 202010880767.3

(51) Int. Cl.
*G06F 13/28* (2006.01)
*G06F 13/16* (2006.01)
(Continued)

(52) U.S. Cl.
CPC .......... *G06F 13/28* (2013.01); *G06F 9/45558* (2013.01); *G06F 13/1668* (2013.01); *G06F 21/44* (2013.01); *G06F 2009/45583* (2013.01)

(58) Field of Classification Search
CPC .. G06F 9/45558; G06F 13/1668; G06F 13/28; G06F 21/44; G06F 2009/45583
See application file for complete search history.

(56) References Cited

U.S. PATENT DOCUMENTS 9,558,146 B2 1/2017 Sharp et al.
2008/0043750 A1* 2/2008 Keels ..................... H04L 69/12 370/395.52
(Continued)

FOREIGN PATENT DOCUMENTS

CN 105335309 A 2/2016
CN 109960671 A 7/2019
(Continued)

OTHER PUBLICATIONS

Extended European Search Report issued in corresponding European Application No. 21173440.5, dated Oct. 22, 2021, pp. 1-7, European Patent Office, Munich, Germany.
(Continued)

*Primary Examiner* — Eric T Oberly
(74) *Attorney, Agent, or Firm* — HAUPTMAN HAM, LLP

(57) ABSTRACT

A data processing method includes sending, by a network interface card of a first device, a request packet to a second device. The request packet is used to request to read data in a destination storage area of the second device. The network interface card receives a response packet that is sent by the second device in response to the request packet. The response packet includes the data. The network interface card initiates, based on the response packet, direct memory access to a storage address to write the data into a memory area to which the storage address points. The first data does not need to be cached in a memory of the network interface card. Bandwidth resource usage and storage space usage of the memory of the network interface card can be reduced.

18 Claims, 9 Drawing Sheets

(51) Int. Cl.
*G06F 21/44* (2013.01)
*G06F 9/455* (2018.01)

(56) References Cited

U.S. PATENT DOCUMENTS

2014/0258438 A1* 9/2014 Ayoub .................... G06F 13/28 709/212
2015/0263887 A1* 9/2015 Sajeepa ............... H04L 41/0803 709/220
2016/0077946 A1* 3/2016 Raikin ................ G06F 12/1009 710/14
2016/0127493 A1 5/2016 Shalom et al.
2017/0068640 A1* 3/2017 Shahar ................ H04L 67/1097
2019/0079897 A1 3/2019 Kochevar-Cureton et al.
2020/0065269 A1 2/2020 Balasubramani et al.

FOREIGN PATENT DOCUMENTS

WO 2018032510 A1 2/2018
WO 2020001459 A1 1/2020

OTHER PUBLICATIONS

Chinese Office Action issued in corresponding Chinese Application No. 202010880767.3, dated Jul. 2023, pp. 1-7.

* cited by examiner

| | 64 | 32 | 32 |
|---|---|---|---|
| (1) | Address (address) | Remote permission (R_key) | Length (length) |

| | 64 | 32 | 14 | 18 |
|---|---|---|---|---|
| (2) | Address (address) | Remote permission (R_key) | Virtual machine memory identification | Length (length) |

FIG. 5B

| | 64 | 32 | 32 |
|---|---|---|---|
| (1) | Address (address) | Local permission (L_key) | Length (length) |

| | 64 | 20 | 12 | 32 |
|---|---|---|---|---|
| (2) | Address (address) | Local permission (L_key) | Virtual machine memory identification | Length (length) |

FIG. 6A (1)

| 64 | 32 | 32 |
|---|---|---|
| Address (address) | Remote permission (R_key) | Length (length) |

(2)

| 64 | 20 | 12 | 32 |
|---|---|---|---|
| Address (address) | Remote permission (R_key) | Virtual machine memory identification | Length (length) |

(1)

| 64 | 32 | 32 |
|---|---|---|
| Address (address) | Local permission (L_key) | Length (length) |

(2)

| 12 | 52 | 32 | 32 |
|---|---|---|---|
| Virtual machine memory identification | Address (address) | Local permission (L_key) | Length (length) |

|     | 64 | 32 | 32 |
|---|---|---|---|
| (1) | Address (address) | Remote permission (R_key) | Length (length) |

|     | 12 | 52 | 32 | 12 | 32 |
|---|---|---|---|---|---|
| (2) | Virtual machine memory identification | Address (address) | Remote permission (R_key) | | Length (length) |

DATA PROCESSING AND WRITING METHOD BASED ON VIRTUAL MACHINE MEMORY IDENTIFICATION FIELD AND DEVISE

CROSS-REFERENCE TO RELATED APPLICATIONS

This application claims priority to Chinese Patent Application No. 202010880767.3, filed with the China Patent Office on Aug. 27, 2020 and entitled "DATA PROCESSING METHOD AND DEVICE", which claims priority to Chinese Patent Application No. 202010427381.7, filed with the China Patent Office on May 19, 2020 and entitled "NVME OVER RDMA STORAGE SERVICE VISUALIZATION PROCESSING METHOD AND APPARATUS". All of the aforementioned patent applications are hereby incorporated by reference in their entireties.

TECHNICAL FIELD

This description relates to the field of data processing technologies, and in particular, to a data processing method and a device.

BACKGROUND

A non-volatile memory host processor controller interface specification non-volatile memory host controller interface specification, (NVMHCIS, or NVMe for short) over fabric (NVMe over Fabric) is a popular storage technology that recently appears, and can implement resource sharing of a remote memory. The NVMe over fabric mainly includes NVMe over remote direct memory access remote direct memory access, (RDMA) (NVMe over RDMA), and accesses a memory of a remote device by using an RDMA technology. Commonly used RDMA technologies of the NVMe over RDMA include an RDMA over converged Ethernet (RoCE) technology, an internet wide area RDMA protocol (iWARP) technology, an infinite bandwidth (IB) technology, and the like.

In an existing technical solution, in a process in which an initiator device reads/writes data from/into the memory of the remote device by using the NVMe over RDMA, the read/written data needs to be forwarded by using a memory of a network interface card. For example, in a process in which the initiator device reads the data from the memory of the remote device, the data read from the remote device needs to be first written into the memory of the network interface card of the initiator device, and then a processor of the network interface card sends the written data into a memory of a processor of the initiator device. However, in a process in which the initiator device writes the data into the memory of the remote device, the network interface card of the initiator device needs to first move the data from the memory of the processor to the memory of the network interface card, and then the processor of the network interface card interacts with the network interface card of the remote device to write the data into the memory of the remote device. The read/written data forwarded by using the memory of the network interface card occupies bandwidth resources and space of the memory of the network interface card. This strains bandwidth and storage space of the memory of the network interface card.

In conclusion, in the process in which the initiator device reads/writes the data from/into the memory of the remote device by using the NVMe over RDMA, how to reduce bandwidth resource usage and storage space usage that are of the memory of the network interface card is a technical problem that needs to be urgently resolved by persons skilled in the art.

SUMMARY

This application provides a data processing method and a device, to reduce bandwidth resource usage and storage space usage that are of a memory of a network interface card, thereby reducing a data transmission delay.

According to a first aspect, this application provides a data processing method. The method includes:

A network interface card of a first device sends a first request packet to a second device. The first request packet is used to request to read first data, and the first data is stored in a first destination storage area of the second device. The network interface card receives a first response packet that is sent by the second device in response to the first request packet. The first response packet includes the first data. The network interface card initiates, based on the first response packet, direct memory access DMA to a first storage address to write the first data into a memory area to which the first storage address points. The memory area to which the first storage address points belongs to a memory area of a host of the first device. The first data does not need to be cached in a memory of the network interface card.

In this application, after obtaining the first data, the network interface card of the first device may directly initiate the DMA access to the first storage address to write the first data into the first storage address, and does not need to first cache the first data in the memory of the network interface card. Therefore, bandwidth resource usage and storage space usage that are of a memory of the network interface card of the first device can be reduced, the bandwidth resource usage and the storage space usage that are of the memory of the network interface card are improved, and a data transmission delay is significantly reduced.

In a possible implementation, the first response packet includes a first virtual machine memory identification, the first virtual machine memory identification points to a first memory area configured by the host for a first virtual machine, and the first memory area includes the memory area to which the first storage address points. That the network interface card initiates, based on the first response packet, direct memory access DMA to a first storage address to write the first data into a memory area to which the first storage address points includes: The network interface card initiates, based on the first virtual machine memory identification, the DMA to the first storage address in the first memory area to write the first data into the memory area to which the first storage address points.

In this application, when data does not need to be forwarded by the memory of the network interface card of the first device, direct memory access may further be implemented on a memory of a virtual machine, so that this application further supports complex storage service processing.

In a possible implementation, before that the network interface card writes the first data into the memory area to which the first storage address points, the method further includes:

The network interface card finds, by using the first virtual machine memory identification as an index, that the memory area to which the first storage address points is in an address range included in an address permission table. The address permission table includes an address range in which the network interface card has permission to initiate the DMA access.

In this application, the network interface card is checked to determine whether an address at which the DMA access is to be initiated falls within an accessible range, and the access can be initiated only when the address falls within the accessible range, thereby ensuring security of data in a memory of the host, and avoiding a problem such as data leakage caused by abnormal access.

In a possible implementation, the first request packet includes the first virtual machine memory identification, the first virtual machine memory identification is set in a local permission L_key field of the first request packet, and the L_key is a permission identifier used by the network interface card to perform the DMA access on the memory of the host. The first virtual machine memory identification is set in a remote permission R_key field of the first response packet, and the R_key is a permission identifier used by a network interface card of the second device to perform remote access on the memory of the host.

In this embodiment of this application, an existing L_key and an existing R_key may be replaced with virtual machine memory identifications, and existing fields (the L_key field and the R_key field) that are no longer used each are used to carry the virtual machine memory identification. Therefore, usage of the field can be improved, and excessive resource occupation caused by adding a new field is avoided.

In a possible implementation, the first request packet includes the first virtual machine memory identification, the first request packet and the first response packet each include a virtual machine memory identification field, and the first virtual machine memory identification is set in the virtual machine memory identification field. The virtual machine memory identification field is obtained by occupying some bytes in a length length field of the first request packet and a length length field of the first response packet, and bytes in the length field other than the bytes occupied by the virtual machine memory identification field are used to store length values of memory blocks included in the memory area to which the first storage address points. Alternatively, the virtual machine memory identification field is obtained by occupying some bytes in an address address field of the first request packet and an address address field of the first response packet, and bytes in the address field other than the bytes occupied by the virtual machine memory identification field are used to store values of start addresses of memory blocks included in the memory area to which the first storage address points.

In a possible implementation, the first request packet includes the first virtual machine memory identification, the first request packet and the first response packet each include a virtual machine memory identification field, and the first virtual machine memory identification is set in the virtual machine memory identification field. The virtual machine memory identification field in the first request packet is obtained by occupying some bytes in a local permission L_key field of the first request packet, and bytes in the L_key field other than the bytes occupied by the virtual machine memory identification field are used to store a permission identifier used by the network interface card to perform the DMA access on the memory area to which the first storage address points. The virtual machine memory identification field in the first response packet is obtained by occupying some bytes in a remote permission R_key field of the first response packet, and bytes in the R_key field other than the bytes occupied by the virtual machine memory identification field are used to store a permission identifier used by a network interface card of the second device to perform remote access on the memory area to which the first storage address points.

In the foregoing two possible embodiments, a new virtual machine memory identification field is added by occupying redundant bytes in existing fields (the length field and the address field, or the L_key field and the R_key field) to carry a virtual machine memory identification. Similarly, usage of these fields can be improved, and excessive resource occupation because additional bytes are required to add a new field is avoided.

According to a second aspect, this application provides a data processing method. The method includes:

A network interface card of a first device sends a second request packet to a second device. The second request packet is used to request to write second data into a second destination storage area of the second device, the second data is stored in a memory area to which a second storage address points, and the memory area to which the second storage address points belongs to a memory area of a host of the first device. The network interface card receives a second response packet that is sent by the second device in response to the second request packet, and the second response packet includes the second storage address. The network interface card initiates, based on the second response packet, direct memory access DMA to the second storage address to read the second data. The network interface card sends the read second data to the second device. The second data does not need to be cached in a memory of the network interface card.

In this application, the network interface card of the first device may directly initiate the DMA access to the second storage address to read the second data, and does not need to first cache the second data in the memory of the network interface card. Therefore, bandwidth resource usage and storage space usage that are of the memory of the network interface card of the first device can be reduced, the bandwidth resource usage and the storage space usage that are of the memory of the network interface card are improved, and a data transmission delay is significantly reduced.

In a possible implementation, the second response packet includes a second virtual machine memory identification, the second virtual machine memory identification points to a second memory area configured by the host for a second virtual machine, and the second memory area includes the memory area to which the second storage address points. That the network interface card initiates, based on the second response packet, direct memory access DMA to the second storage address to read the second data includes: The network interface card initiates, based on the second virtual machine memory identification, the DMA to the second storage address in the second memory area to read the second data.

In this application, when data does not need to be forwarded by the memory of the network interface card of the first device, direct memory access may further be implemented on a memory of a virtual machine, so that this application further supports complex storage service processing.

In a possible implementation, before that the network interface card initiates, based on the second virtual machine memory identification, the DMA to the second storage address in the second memory area to read the second data, the method further includes: The network interface card finds, by using the second virtual machine memory identification as an index, that the memory area to which the second storage address points is in an address range included in an address permission table. The address permission table includes an address range in which the network interface card has permission to initiate the DMA access.

In this application, the network interface card is checked to determine whether an address at which the DMA access is to be initiated falls within an accessible range, and the access can be initiated only when the address falls within the accessible range, thereby ensuring security of data in a memory of the host, and avoiding a problem such as data leakage caused by abnormal access.

In a possible implementation, the second request packet includes the second virtual machine memory identification, the second virtual machine memory identification is set in a local permission L_key field of the second request packet, and the L_key is a permission identifier used by the network interface card to perform the access on a memory of the host. The second virtual machine memory identification is set in a remote permission R_key field of the second response packet, and the R_key is a permission identifier used by a network interface card of the second device to perform remote access on the second virtual machine memory identification.

In this embodiment of this application, an existing L_key and an existing R_key may be replaced with virtual machine memory identifications, and existing fields (the L_key field and the R_key field) that are no longer used each are used to carry the virtual machine memory identification. Therefore, usage of the field can be improved, and excessive resource occupation caused by adding a new field is avoided.

In a possible implementation, the second request packet includes the second virtual machine memory identification, the second request packet and the second response packet each include a virtual machine memory identification field, and the second virtual machine memory identification is set in the virtual machine memory identification field. The virtual machine memory identification field is obtained by occupying some bytes in a length length field of the second request packet and a length length field of the second response packet, and bytes in the length field other than the bytes occupied by the virtual machine memory identification field are used to store length values of memory blocks included in the memory area to which the second storage address points. Alternatively, the virtual machine memory identification field is obtained by occupying some bytes in an address address field of the second request packet and an address address field of the second response packet, and bytes in the address field other than the bytes occupied by the virtual machine memory identification field are used to store values of start addresses of memory blocks included in the memory area to which the second storage address points.

In a possible implementation, the second request packet includes the second virtual machine memory identification, the second request packet and the second response packet each include a virtual machine memory identification field, and the second virtual machine memory identification is set in the virtual machine memory identification field. The virtual machine memory identification field in the second request packet is obtained by occupying some bytes in a local permission L_key field of the second request packet, and bytes in the L_key field other than the bytes occupied by the virtual machine memory identification field are used to store a permission identifier used by the network interface card to perform the DMA access on the memory area to which the second storage address points. The virtual machine memory identification field in the second response packet is obtained by occupying some bytes in a remote permission R_key field of the second response packet, and bytes in the R_key field other than the bytes occupied by the virtual machine memory identification field are used to store a permission identifier used by a network interface card of the second device to perform remote access on the memory area to which the second storage address points.

In the foregoing two possible embodiments, a new virtual machine memory identification field is added by occupying redundant bytes in existing fields (the length field and the address field, or the L_key field and the R_key field) to carry a virtual machine memory identification. Similarly, usage of these fields can be improved, and excessive resource occupation because additional bytes are required to add a new field is avoided.

According to a third aspect, this application provides a data processing method. The method includes:

A network interface card of a first device receives a third request from a processor of a host of the first device. The third request is used to request to write third data into a third destination storage area of a second device, and the third request includes a third storage address of the third data in a memory of the host of the first device. The network interface card initiates, based on the third request, direct memory access DMA to the third storage address to read the third data. The network interface card sends the read third data to the second device. The third data does not need to pass through a memory of the network interface card. The third request may also be referred to as a third command.

In this embodiment of this application, two interaction steps are reduced. One is that the network interface card of the first device sends a request packet for writing data into the second device, and the other is that the second device sends, to the network interface card of the first device based on the request packet, a response packet for reading the data. In this application, the network interface card of the first device directly reads data and sends the data to the second device, so that the second device writes the data into a destination storage area, thereby greatly improving data write efficiency and reducing a data write delay.

In a possible implementation, the third request includes an identifier, and the identifier is used to indicate the network interface card to read the third data. That the network interface card initiates, based on the third request, direct memory access DMA to the third storage address to read the third data includes: The network interface card initiates, based on the identifier, the DMA to the third storage address to read the third data.

In this application, an identifier may be used to trigger the network interface card of the first device to perform the DMA to read the data that is to be written into a memory of the second device from the memory of the host. This is simple and convenient.

In a possible implementation, the third request further includes a third virtual machine memory identification, the third virtual machine memory identification points to a third memory area configured by the host for a first virtual machine, and the third memory area includes a memory area to which the third storage address points.

That the network interface card initiates the direct memory access DMA to the third storage address to read the third data includes:

The network interface card initiates, based on the third virtual machine memory identification, the direct memory access DMA to the third storage address in the third memory area to read the third data.

In this application, when data does not need to be forwarded by the memory of the network interface card of the first device, direct memory access may further be implemented on a memory of a virtual machine, so that this application further supports complex storage service processing.

According to a fourth aspect, this application provides a data processing network interface card. The network interface card is a network interface card in a first device, and the network interface card includes the following units.

A sending unit is configured to send a first request packet to a second device. The first request packet is used to request to read first data, and the first data is stored in a first destination storage area of the second device.

A receiving unit is configured to receive a first response packet that is sent by the second device in response to the first request packet. The first response packet includes the first data.

A writing unit is configured to initiate, based on the first response packet by using a hardware component of the network interface card, direct memory access DMA to a first storage address to write the first data into a memory area to which the first storage address points. The memory area to which the first storage address points belongs to a memory area of a host of the first device, and the first data does not need to be cached in a memory of the network interface card.

In a possible implementation, the first response packet includes a first virtual machine memory identification, the first virtual machine memory identification points to a first memory area configured by the host for a first virtual machine, and the first memory area includes the memory area to which the first storage address points. The writing unit is configured to initiate, based on the first virtual machine memory identification, the DMA to the first storage address in the first memory area to write the first data into the memory area to which the first storage address points.

In a possible implementation, the network interface card further includes a querying unit, configured to: before that the writing unit writes the first data into the memory area to which the first storage address points, find, by using the first virtual machine memory identification as an index, that the memory area to which the first storage address points is in an address range included in an address permission table. The address permission table includes an address range in which the network interface card has permission to initiate the DMA access.

In a possible implementation, the first request packet includes the first virtual machine memory identification, the first virtual machine memory identification is set in a local permission L_key field of the first request packet, and the L_key is a permission identifier used by the network interface card to perform the DMA access on the memory of the host. The first virtual machine memory identification is set in a remote permission R_key field of the first response packet, and the R_key is a permission identifier used by a network interface card of the second device to perform remote access on the memory of the host.

In a possible implementation, the first request packet includes the first virtual machine memory identification, the first request packet and the first response packet each include a virtual machine memory identification field, and the first virtual machine memory identification is set in the virtual machine memory identification field. The virtual machine memory identification field is obtained by occupying some bytes in a length length field of the first request packet and a length length field of the first response packet, and bytes in the length field other than the bytes occupied by the virtual machine memory identification field are used to store length values of memory blocks included in the memory area to which the first storage address points. Alternatively, the virtual machine memory identification field is obtained by occupying some bytes in an address address field of the first request packet and an address address field of the first response packet, and bytes in the address field other than the bytes occupied by the virtual machine memory identification field are used to store values of start addresses of memory blocks included in the memory area to which the first storage address points.

In a possible implementation, the first request packet includes the first virtual machine memory identification, the first request packet and the first response packet each include a virtual machine memory identification field, and the first virtual machine memory identification is set in the virtual machine memory identification field. The virtual machine memory identification field in the first request packet is obtained by occupying some bytes in a local permission L_key field of the first request packet, and bytes in the L_key field other than the bytes occupied by the virtual machine memory identification field are used to store a permission identifier used by the network interface card to perform the DMA access on the memory area to which the first storage address points.

The virtual machine memory identification field in the first response packet is obtained by occupying some bytes in a remote permission R_key field of the first response packet, and bytes in the R_key field other than the bytes occupied by the virtual machine memory identification field are used to store a permission identifier used by a network interface card of the second device to perform remote access on the memory area to which the first storage address points.

According to a fifth aspect, this application provides a data processing network interface card. The network interface card is a network interface card in a first device, and the network interface card includes the following units.

A sending unit is configured to send a second request packet to a second device. The second request packet is used to request to write second data into a second destination storage area of the second device, the second data is stored in a memory area to which a second storage address points, and the memory area to which the second storage address points belongs to a memory area of a host of the first device.

A receiving unit is configured to receive a second response packet that is sent by the second device in response to the second request packet, and the second response packet includes the second storage address.

A reading unit is configured to initiate, based on the second response packet by using a hardware component of the network interface card, direct memory access DMA to the second storage address to read the second data.

The sending unit is further configured to send the read second data to the second device. The second data does not need to be cached in a memory of the network interface card.

In a possible implementation, the second response packet includes a second virtual machine memory identification, the second virtual machine memory identification points to a second memory area configured by the host for a second virtual machine, and the second memory area includes the memory area to which the second storage address points. The reading unit is configured to initiate, based on the second virtual machine memory identification, the DMA to the second storage address in the second memory area to read the second data.

In a possible implementation, the network interface card further includes a querying unit, configured to: before that the reading unit initiates, based on the second virtual machine memory identification, the DMA to the second storage address in the second memory area to read the second data, find, by using the second virtual machine memory identification as an index, that the memory area to which the second storage address points is in an address range included in an address permission table. The address permission table includes an address range in which the network interface card has permission to initiate the DMA access.

In a possible implementation, the second request packet includes the second virtual machine memory identification, the second virtual machine memory identification is set in a local permission L_key field of the second request packet, and the L_key is a permission identifier used by the network interface card to perform the access on a memory of the host. The second virtual machine memory identification is set in a remote permission R_key field of the second response packet, and the R_key is a permission identifier used by a network interface card of the second device to perform remote access on the second virtual machine memory identification.

In a possible implementation, the second request packet includes the second virtual machine memory identification, the second request packet and the second response packet each include a virtual machine memory identification field, and the second virtual machine memory identification is set in the virtual machine memory identification field. The virtual machine memory identification field is obtained by occupying some bytes in a length length field of the second request packet and a length length field of the second response packet, and bytes in the length field other than the bytes occupied by the virtual machine memory identification field are used to store length values of memory blocks included in the memory area to which the second storage address points. Alternatively, the virtual machine memory identification field is obtained by occupying some bytes in an address address field of the second request packet and an address address field of the second response packet, and bytes in the address field other than the bytes occupied by the virtual machine memory identification field are used to store values of start addresses of memory blocks included in the memory area to which the second storage address points.

In a possible implementation, the second request packet includes the second virtual machine memory identification, the second request packet and the second response packet each include a virtual machine memory identification field, and the second virtual machine memory identification is set in the virtual machine memory identification field. The virtual machine memory identification field in the second request packet is obtained by occupying some bytes in a local permission L_key field of the second request packet, and bytes in the L_key field other than the bytes occupied by the virtual machine memory identification field are used to store a permission identifier used by the network interface card to perform the DMA access on the memory area to which the second storage address points.

The virtual machine memory identification field in the second response packet is obtained by occupying some bytes in a remote permission R_key field of the second response packet, and bytes in the R_key field other than the bytes occupied by the virtual machine memory identification field are used to store a permission identifier used by a network interface card of the second device to perform remote access on the memory area to which the second storage address points.

According to a sixth aspect, this application provides a data processing network interface card. The network interface card is a network interface card in a first device, and the network interface card includes the following units.

A receiving unit is configured to receive a third request from a processor of a host of the first device. The third request is used to request to write third data into a third destination storage area of a second device, and the third request includes a third storage address of the third data in a memory of the host of the first device.

A reading unit is configured to initiate, based on the third request, direct memory access DMA to the third storage address to read the third data.

A sending unit is configured to send the read third data to the second device. The third data does not need to pass through memory of the network interface card.

In a possible implementation, the third request includes an identifier, and the identifier is used to indicate the network interface card to read the third data. The reading unit is configured to initiate, based on the identifier, the DMA to the third storage address to read the third data.

In a possible implementation, the third request further includes a third virtual machine memory identification, the third virtual machine memory identification points to a third memory area configured by the host for a first virtual machine, and the third memory area includes a memory area to which the third storage address points. The reading unit is configured to:

initiate, based on the third virtual machine memory identification, the direct memory access DMA to the third storage address in the third memory area to read the third data.

According to a seventh aspect, this application provides a network interface card. The network interface card includes a processor, a receiving interface, a sending interface, and a memory. The memory is configured to store a computer program and data, and the processor is configured to execute the computer program stored in the memory, so that the network interface card performs the following operations:

sending a first request packet to a second device through the sending interface, where the first request packet is used to request to read first data, and the first data is stored in a first destination storage area of the second device;

receiving a first response packet, through the receiving interface, that is sent by the second device in response to the first request packet, where the first response packet includes the first data; and initiating, based on the first response packet by using a hardware component of the network interface card, direct memory access DMA to a first storage address to write the first data into a memory area to which the first storage address points, where the memory area to which the first storage address points belongs to a memory area of a host of the first device, and the first data does not need to be cached in a memory of the network interface card.

In a possible implementation, the first response packet includes a first virtual machine memory identification, the first virtual machine memory identification points to a first memory area configured by the host for a first virtual machine, and the first memory area includes the memory area to which the first storage address points. The initiating, based on the first response packet, direct memory access DMA to a first storage address to write the first data into a memory area to which the first storage address points includes:

initiating, based on the first virtual machine memory identification, the DMA to the first storage address in the first memory area to write the first data into the memory area to which the first storage address points.

In a possible implementation, before the writing, by the network interface card, the first data into the memory area to which the first storage address points, the network interface card further performs the following operation:

finding, by using the first virtual machine memory identification as an index, that the memory area to which the first storage address points is in an address range included in an address permission table, where the address permission table includes an address range in which the network interface card has permission to initiate the DMA access.

According to an eighth aspect, this application provides a network interface card. The network interface card includes a processor, a receiving interface, a sending interface, and a memory. The memory is configured to store a computer program and data, and the processor is configured to execute the computer program stored in the memory, so that the network interface card performs the following operations:

sending a second request packet to a second device through the sending interface, where second request packet is used to request to write second data into a second destination storage area of the second device, the second data is stored in a memory area to which a second storage address points, and the memory area to which the second storage address points belongs to a memory area of a host of the first device;

receiving, through the receiving interface, a second response packet that is sent by the second device in response to the second request packet, where the second response packet includes the second storage address;

initiating, based on the second response packet by using a hardware component of the network interface card, direct memory access DMA to the second storage address to read the second data; and sending the read second data to the second device through the sending interface, where the second data does not need to be cached in a memory of the network interface card.

In a possible implementation, the second response packet includes a second virtual machine memory identification, the second virtual machine memory identification points to a second memory area configured by the host for a second virtual machine, and the second memory area includes the memory area to which the second storage address points. The initiating, based on the second response packet, direct memory access DMA to the second storage address to read the second data includes: initiating, based on the second virtual machine memory identification, the DMA to the second storage address in the second memory area to read the second data.

In a possible implementation, before the initiating, by the network interface card based on the second virtual machine memory identification, the DMA to the second storage address in the second memory area to read the second data, the network interface card further performs the following operations:

finding, by using the second virtual machine memory identification as an index, that the memory area to which the second storage address points is in an address range included in an address permission table, where the address permission table includes an address range in which the network interface card has permission to initiate the DMA access.

According to a ninth aspect, this application provides a network interface card. The network interface card includes a processor, a receiving interface, a sending interface, and a memory. The memory is configured to store a computer program and data, and the processor is configured to execute the computer program stored in the memory, so that the network interface card performs the following operations:

receiving, through the receiving interface, a third request from a processor of a host of the first device, where the third request is used to request to write third data into a third destination storage area of a second device, and the third request includes a third storage address of the third data in a memory of the host of the first device;

initiating, based on the third request by using a hardware component of the network interface card, direct memory access DMA to the third storage address to read the third data; and sending the read third data to the second device through the sending interface, where the third data does not need to pass through a memory of the network interface card.

In a possible implementation, the third request includes an identifier, and the identifier is used to indicate the network interface card to read the third data. The initiating, based on the third request by using a hardware component of the network interface card, direct memory access DMA to the third storage address to read the third data includes: initiating, based on the identifier by using the hardware component of the network interface card, the DMA to the third storage address to read the third data.

The third request further includes a third virtual machine memory identification, the third virtual machine memory identification points to a third memory area configured by the host for a first virtual machine, and the third memory area includes a memory area to which the third storage address points.

That the network interface card initiates the direct memory access DMA to the third storage address to read the third data includes:

The network interface card initiates, based on the third virtual machine memory identification, the direct memory access DMA to the third storage address in the third memory area to read the third data.

According to a tenth aspect, this application provides a computer-readable storage medium. The computer-readable storage medium stores a computer program, and the computer program is executed by a processor to implement the method according to any one of the first aspect; the computer program is executed by a processor to implement the method according to any one of the second aspect; or the computer program is executed by a processor to implement the method according to any one of the third aspect.

According to an eleventh aspect, this application provides a computer program product. When the computer program product is read and executed by a computer, the method according to any one of the first aspect is performed; when the computer program product is read and executed by a computer, the method according to any one of the second aspect is performed; or when the computer program product is read and executed by a computer, the method according to any one of the third aspect is performed.

In conclusion, in this application, the network interface card of the first device may directly initiate the DMA access to the memory of the host of the first device to read/write data, and does not need to first cache the data in the memory of the network interface card. Therefore, the bandwidth resource usage and the storage space usage that are of the memory of the network interface card of the first device can be reduced, the bandwidth resource usage and the storage space usage that are of the memory of the network interface card are improved, and the data transmission delay is significantly reduced.

BRIEF DESCRIPTION OF DRAWINGS

The following describes accompanying drawings required in embodiments of this application.

FIG. 5B is a schematic structural diagram of another packet according to an embodiment of this application;

FIG. 6A is a schematic structural diagrams of another packet according to an embodiment of this application;

DESCRIPTION OF EMBODIMENTS

The following describes embodiments of this application with reference to accompanying drawings.

Figure 1:
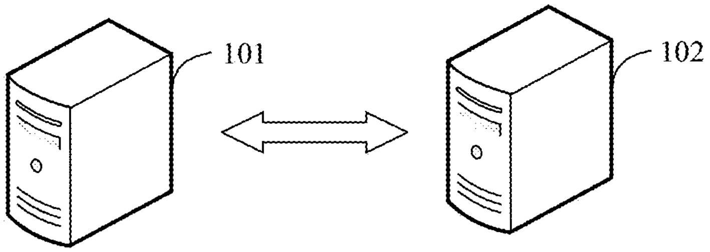
FIG. 1 is a schematic diagram of a scenario according to an embodiment of this application.

FIG. 1 shows a possible application scenario to which a data processing method according to an embodiment of this application is applicable. The scenario includes a first device 101 and a second device 102, and the first device 101 and the second device 102 may communicate with each other. In this embodiment of this application, the first device 101 and the second device 102 may support an NVMe over RDMA standard, for example, support an RoCE technical standard, an iWARP technical standard, and an IB technical standard. Therefore, the first device 101 and the second device 102 may implement remote direct memory access RDMA communication.

The first device 101 may be a client, and the client may include a server, a workstation, or the like. The server may include any server that can implement a computing function. The client may further include a handheld device (for example, a mobile phone, a tablet computer, or a palmtop computer), a vehicle-mounted device, a wearable device (for example, a smartwatch, a smart band, or a pedometer), a notebook computer, a desktop computer, a smart household device (for example, a refrigerator, a television, an air conditioner, or an electricity meter), an intelligent robot, a workshop device, various forms of user equipment (UE), a mobile station (MS), a terminal device, or the like.

The second device 102 may be a server, and the server may include but is not limited to a background server, a data storage device, or the like.

Alternatively, both the first device 101 and the second device 102 may be the foregoing clients. Alternatively, both the first device 101 and the second device 102 may be the foregoing servers. Alternatively, the first device 101 is the foregoing server, and the second device 102 is the foregoing client.

An application scenario of the data processing method provided in this embodiment of this application is not limited to the scenario shown in FIG. 1. The scenario shown in FIG. 1 is merely an example, and all scenarios to which the data processing method provided in the embodiments of this application can be applied fall within the protection scope of this application.

Figure 2:
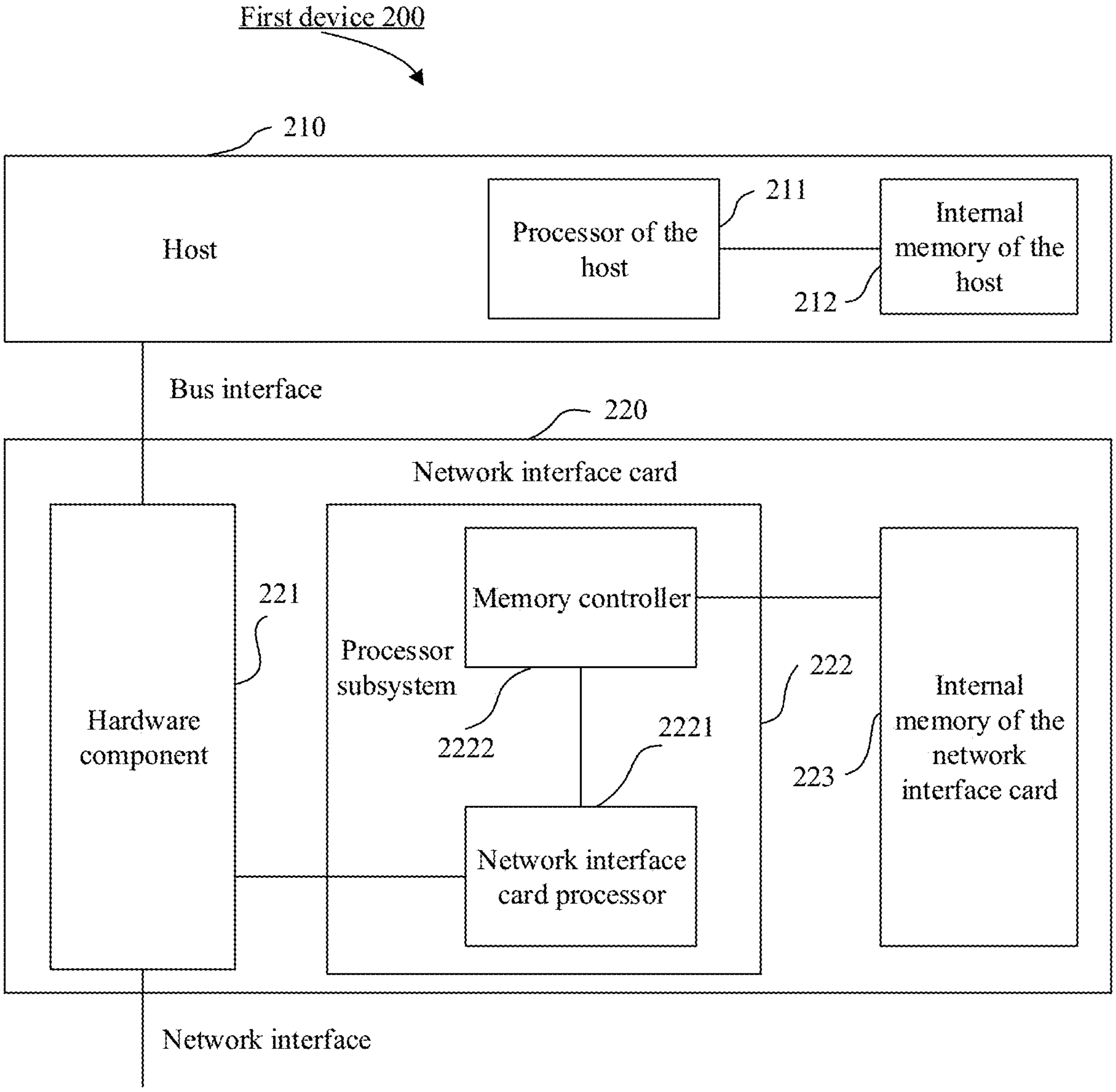
FIG. 2 is a schematic structural diagram of a device according to an embodiment of this application.

FIG. 2 is a schematic structural diagram of hardware of a first device according to an embodiment of this application. The first device may be the first device 101 shown in FIG. 1. A first device 200 shown in FIG. 2 includes a host 210 and a network interface card 220. The host 210 includes a processor 211 of the host and an internal memory 212 of the host. The internal memory of the host may be referred to as a memory of the host for short. The network interface card 220 includes a hardware component 221, a processor subsystem 222, and an internal memory 223 of the network interface card. The internal memory of the network interface card may be referred to as a memory of the network interface card for short. The processor subsystem 222 further includes a network interface card processor 2221 and a memory controller 2222.

The processor 211 of the host and the internal memory 212 of the host may be connected through an internal bus. The internal bus may be an advanced system bus (ASB), an advanced high-performance bus (AHB), a coherent hub interface (CHI) bus, or the like.

The processor 211 of the host may be a central processing unit (CPU), a complex programmable logic device, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor.

The processor 211 of the host may include one or more processors. When the processor 211 of the host includes a plurality of processors, the plurality of processors may be integrated into a same chip, or each of the plurality of processors may be an independent chip. One processor may include one or more processing cores. In each of the following embodiments, a plurality of cores are used as an example to perform description, but a data processing method provided in the embodiments may also be applied to a single-core processor.

In this embodiment of this application, the processor 211 of the host may be configured to receive instructions, entered by a user, for obtaining or writing data, and send, to the network interface card 220, a command for reading or writing data at a destination address. The processor 211 of the host may further be configured to perform another operation. For details, refer to descriptions in the following embodiment. Details are not described herein. All operations performed by the host described in the following embodiments are operations performed by the processor of the host. This is described herein.

Both the internal memory 212 of the host and the internal memory 223 of the network interface card may be a memory module, a synchronous dynamic random-access memory (SDRAM), a double data rate synchronous dynamic random access memory (DDR SDRAM), or the like. The DDR SDRAM may be referred to as DDR for short. The memory is any device for storing data, and is not limited to the several types described herein.

The internal memory 212 of the host may be configured to store a running program and other data that are of the processor 211 of the host.

The hardware component 221 of the network interface card is connected to the host 210 through a bus interface. The bus interface may be a peripheral component interconnect (PCI) bus, a peripheral component interconnect express (PCIe) bus, or the like. Such connection may enable the network interface card to initiate a direct memory access (DMA) operation to the internal memory 212 of the host by using the hardware component 221 of the network interface card.

The hardware component 221, the network interface card processor 2221, the memory controller 2222, and the internal memory 223 of the network interface card inside the network interface card may also be connected through the foregoing internal bus.

In a possible implementation, the hardware component 221 and the network interface card processor 2221 may also be connected through the PCI bus, the PCIe bus, or the like. Similarly, such connection may enable the network interface card to initiate a DMA operation to the internal memory 223 of the network interface card by using the hardware component 221 of the network interface card.

The hardware component 221 of the network interface card further includes a network interface, and the network interface may be a wired interface or a wireless interface. For a network interface card that is to be connected by using a network cable, a network interface of the network interface card is a wired interface, and the wired interface may be a bayonet neill-concelman (BNC) connector or a registered jack 45 (RJ45) interface. For a wireless network interface card, a network interface is a wireless interface, and the wireless interface may be a wireless interface based on a wireless local area network (WLAN) protocol. The network interface card may send and receive a packet through the network interface. The network interface may include a sending interface and a receiving interface. The sending interface may be configured to send a packet, and the receiving interface may be configured to receive a packet.

The hardware component 221 may be a channel adapter (CA), and can connect a system to a local area network (Fabric) that supports RDMA. For an infiniband (TB) technology, one CA is one end node (End Node) in an IB subnet. The CA is classified into two types: a host channel adapter (HCA) and a target channel adapter (TCA). The HCA is a CA that supports a “verbs” interface. Unlike the HCA, the TCA does not need to support many functions. For an RoCE technology and an iWARP technology, a concept of the CA is materialized as an RDMA network interface card (RNIC). In the RoCE and the iWARP, one CA is referred to as one RNIC. In other words, the hardware component 221 may be one RNIC.

The processor subsystem 222 is mainly configured to process a protocol (for example, an NVMe over Fabric protocol) and a storage service, and usually runs an operating system (OS). In this way, complex service processing software can run on the processor subsystem 222. In this application, the processor subsystem 222 may further be configured to enhance processing of the RNIC protocol. For details about how the protocol runs, refer to the data processing method described below. Details are not described herein.

The network interface card processor 2221 may be a CPU, a complex programmable logic device, a general-purpose processor, a digital signal processor, an application-specific integrated circuit, a field programmable gate array or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor. The network interface card processor 2221 may be configured to read a program stored in the internal memory 223 of the network interface card, to perform the data processing method provided in this application.

The memory controller 2222 may be configured to control the internal memory 223 of the network interface card and be responsible for data exchange between the internal memory 223 of the network interface card and the network interface card processor 2221.

The internal memory 223 of the network interface card may be configured to store a running program of the network interface card processor 2221 and some entries of the hardware component 221. Because a memory integrated into the hardware component 221 is very small, a larger-scale entry is stored in the internal memory 223 of the network interface card.

In addition, the second device (which may be the second device 102 shown in FIG. 1) in this embodiment of this application and the first device provided in this embodiment of this application, for example, the first device 200 shown in FIG. 2, may be devices of a same type. Alternatively, the second device may be another device that supports NVMe over fabric.

In a possible implementation, the processor subsystem 222 in FIG. 2 is optional. In other words, the network interface card 220 may not include the processor subsystem 222, and an operation performed by the processor subsystem 222 may be performed by the processor 211 of the host.

Before the data processing method provided in the embodiments of this application is described, related concepts of the RDMA technology in this application are first described.

1. Queue Pairs (QP)

RDMA communication is implemented based on a set including three queues: a send queue (SQ), a receive queue (RQ), and a completion queue (CQ). The SQ and RQ are responsible for scheduling, are always created in pairs, and are referred to as a queue pair QP. The CQ is used to send a completion notification when instructions placed on a work queue (the SQ or the RQ) are completed.

When a processor of a host places the instructions in the work queue, it means to notify a network interface card of the device of a buffer (which may be referred to as a buffer when a registered memory is used) whose data is to be sent or a buffer used to receive data. These instructions are some small structures, which are referred to as work requests (WR) or work queue elements (WQE). One WQE mainly includes one pointer pointing to a buffer. One WQE placed in the send queue SQ mainly includes one pointer pointing to a buffer in which data is to be sent. A pointer in one WQE placed in the receive queue RQ points to a segment of buffer, and the buffer is used to store data to be received.

2. RDMA Send and RDMA Receive

An RDMA send operation is used to send data to a receive queue RQ of a remote device by using a send queue SQ. The remote device registers a receive buffer in advance to receive the data. An operation corresponding to the RDMA receive operation is an RDMA send operation. A receive end is notified that data is about to arrive, and the receive end is responsible for registration and maintenance of the receive buffer.

3. RDMA Read and RDMA Write

RDMA read indicates that a device (for example, the second device 102 in FIG. 1) reads data from a memory of a remote device (for example, the first device 101 in FIG. 1). RDMA write indicates that a device (for example, the second device 102 in FIG. 1) writes data into a memory of a remote device (for example, the first device 101 in FIG. 1). The RDMA read and RDMA write operations each can directly manage the memory of the remote device by using obtained permission without notifying a processor of a host of the remote device. For the RDMA read and the RDMA write, the processor of the host of the remote device is unaware before the operation is completed.

4. Physical Function (PF), Virtual Function (VF), and Assignable Device Interface (ADI)

To improve usage of an input/output (I/O) device and reduce a data transmission delay, a single-root input/output virtualization (SR-IOV) technology defines an I/O device with an SR-IOV function as a peripheral physical function PF, and creates a plurality of virtual function VF of devices under the PF. The VF can share a physical resource (for example, a network interface card port and buffer space) of the PF, and is associated with a virtual machine (VM) system on an SR-IOV server.

For example, it is assumed that the I/O device with the SR-IOV function is a storage device. In the SR-IOV technology, a plurality of virtual functions VFs may be virtualized, and each virtual function VF is responsible for managing one piece of storage space in the storage device. In this case, the plurality of VFs are equivalent to a plurality of storage controllers for the virtual machine. Each storage space managed by the VF has an identification, and the identification may be referred to as a VF identification. When the I/O device is to access storage space managed by a VF, the I/O device needs to know a VF identification of the storage space, and finds unique corresponding storage space based on the VF identification.

In addition, the I/O virtualization technology further includes a scalable I/O virtualization (scalable IOV) technology. Similar to the SR-IOV technology, the physical function PF may further be configured to support a plurality of lightweight allocable device interfaces ADIs, and these interfaces may be similarly allocated to different virtual machines as virtual devices.

An example in which the I/O device with the scalable IOV function is a storage device is still used for description. The scalable IOV technology may virtualize a plurality of ADIs for the storage device, and each ADI may be used to access one piece of storage space in the storage device. Storage space corresponding to each ADI has an identification. When the I/O device is to access storage space of an ADI, the I/O device needs to know an identification of the storage space, and finds unique corresponding storage space based on the identification.

In an existing technical solution, in a process in which a first device reads/writes data from/into a memory of a second device by using RDMA, the read/written data is to be forwarded by using a memory of a network interface card of the first device. This strains bandwidth and storage space of the memory of the network interface card of the first device. Therefore, this application provides a data processing method. In a process in which the first device reads/writes the data from/to the memory of the second device, there is no need to forward the read/written data by using the memory of the network interface card of the first device. Therefore, bandwidth resource usage and storage space usage that are of the memory of the network interface card of the first device are reduced, the bandwidth resource usage and the storage space usage that are of the memory of the network interface card are improved, and a data transmission delay is significantly reduced.

Based on the foregoing description, the following describes, by using several embodiments, the data processing method provided in this application.

Embodiment 1

Figure 3:
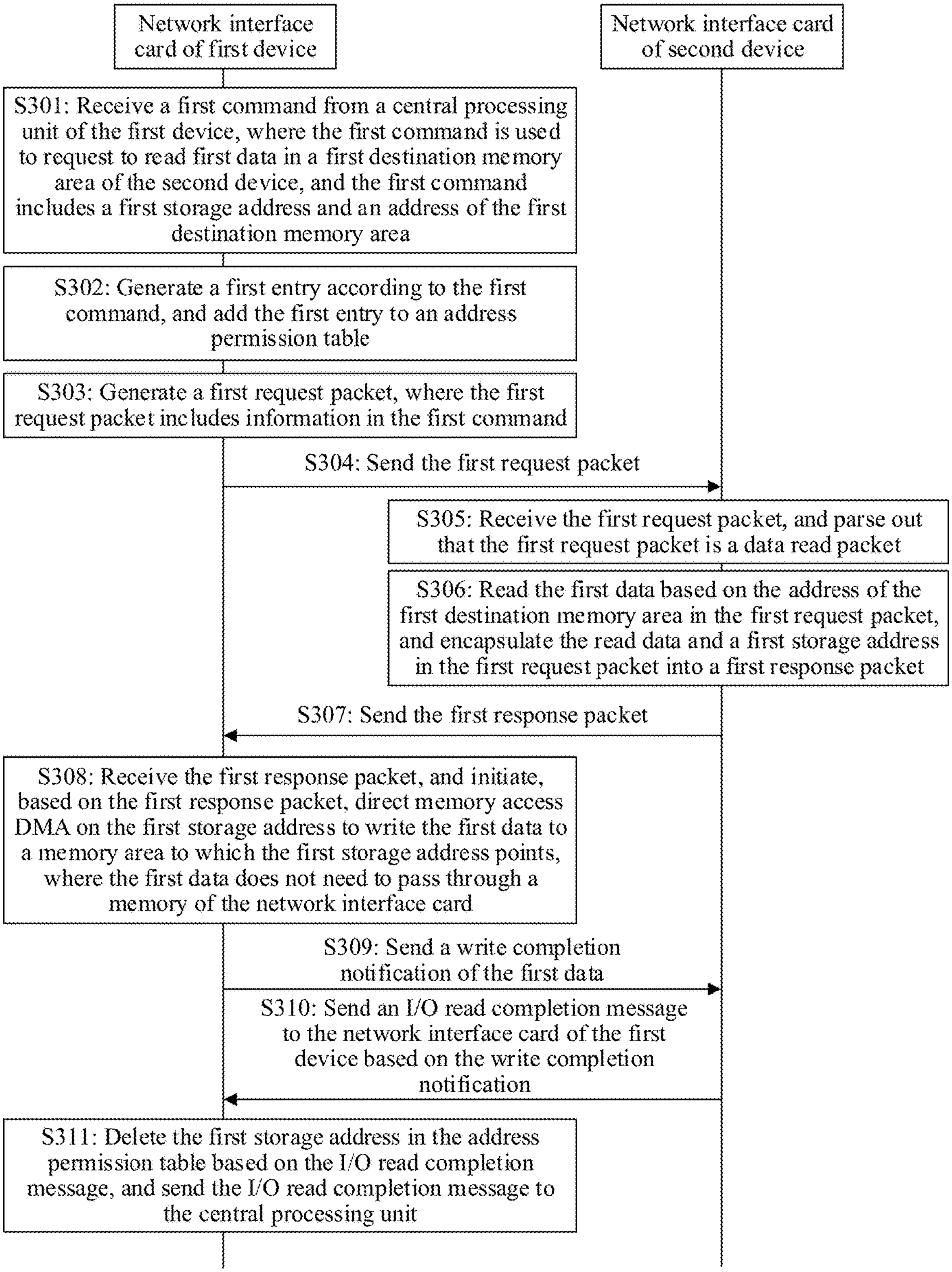
FIG. 3 is a schematic flowchart of a data processing method according to an embodiment of this application.

The following first describes a data processing method for reading data from a memory of a second device by a first device according to an embodiment of this application. Referring to FIG. 3, the method may be implemented based on the scenario shown in FIG. 1 and the structure shown in FIG. 2 or another scenario and structure. The method may include but is not limited to the following steps.

S301: A network interface card of a first device receives a first command from a host of the first device, where the first command is used to request to read first data in a first destination storage area of a second device, and the first command includes a first storage address and an address of the first destination storage area.

A memory area to which the first storage address points is used to store the read first data, and the memory area to which the first storage address points belongs to a memory area of the host of the first device.

For example, the first device may be the first device 101 shown in FIG. 1, the host may be the host 210 shown in FIG. 2, and the network interface card may be the network interface card 220 shown in FIG. 2.

In an example embodiment, before the network interface card of the first device receives the first command from the host of the first device, a queue pair QP for performing RDMA communication is created between the network interface card of the first device and a network interface card of the second device.

The network interface card of the first device and the network interface card of the second device create respective queue pairs. In other words, the network interface card of the first device creates a send queue SQ1 and a receive queue RQ1 that are of the first device. The network interface card of the second device creates a send queue SQ2 and a receive queue RQ2 that are of the second device. In addition, the network interface card of the first device further creates a completion queue CQ1, configured to send an instruction completion notification. Similarly, the network interface card of the second device also creates a completion queue CQ2, configured to send an instruction completion notification.

A message sent by the send queue SQ1 of the network interface card of the first device is received by the receive queue RQ2 of the network interface card of the second device, and a message sent by the send queue SQ2 of the network interface card of the second device is received by the receive queue RQ1 of the network interface card of the first device. The completion queue CQ is mainly used to send operation completion notifications of RDMA send and RDMA receive. Similarly, operation completion notifications of RDMA read and RDMA write may also be sent by using the CQ.

After completing the operation of creating the queue pair, the host of the first device generates the first command in response to a received operation that is of obtaining data and that is input by a user. The received operation that is of obtaining the data and that is input by the user may be, for example, an open operation or a download operation on a file. A specific instruction for obtaining the data is not limited in this solution. For the first device, a storage address of the file, an attribute of the file such as a size of data included in the file, and the like are already stored in the first device. Therefore, the first device may obtain the information based on a corresponding file read operation.

Then, the host of the first device sends the first command to the network interface card of the first device. The host places the first command in the created send queue SQ1. Then, the network interface card receives the first command by using a hardware component (for example, the hardware component 221 shown in FIG. 2) of the network interface card.

The first command may be an input/output (I/O) read command. The first command may include first destination address information, a size of the first data, and a scatter and gather (SG) list. The SG list may be referred to as a first SG list.

The first destination address information is the address of the first destination storage area, and may include destination storage volume information and read storage address information. The destination storage volume information refers to to-be-read data, namely, an identification of the first data in a storage volume of the second device. The read storage address information refers to a start address for storing the first data in the storage volume.

The size of the first data is a size of a data volume of to-be-read first data. For example, the size of the first data may be 512 megabytes.

The first SG list is used to indicate a storage position of the first data in the first device after the first device reads the first data. In other words, the first SG list indicates the first storage address. The memory area to which the first storage address points may include n (n is an integer greater than or equal to 1) memory blocks, and then memory blocks together constitute all memory space required for reading the first data. Therefore, the first SG list may include address information of the n memory blocks. The first SG list may include a start address and a length of each of the n memory blocks. The length of the memory block refers to a size of the memory block. For example, if the size of the memory block is 512 bytes, it may be considered that the length of the memory block is 512 bytes.

S302: The network interface card of the first device generates a first entry according to the first command, and adds the first entry to an address permission table.

After receiving the first command, the network interface card of the first device generates the first entry according to the first command. Content of the first entry includes an address range, and the address range includes an address indicated by the first SG list, in other words, includes the first storage address. Then, the network interface card of the first device adds the generated first entry to the address permission table. The address permission table includes an address range and a read/write permission of direct memory access (DMA) that can be directly initiated by the network interface card of the first device. The read/write permission may be, for example, write permission or read permission. Alternatively, the read/write permission may be read permission and write permission.

In addition, the network interface card of the first device further generates a permission identifier key according to the first command, and associates the permission identifier key with the first entry, so that the first entry can be indexed by using the permission identifier key. In other words, the permission identifier key is an index used by the network interface card of the first device to access the first entry.

It should be noted that the permission identifier key is a local permission identifier (locator key, L_key) for the network interface card of the first device, and the permission identifier key is a remote permission identifier (remote key, R_key) for the network interface card of the second device (the second device may be, for example, the second device 102 shown in FIG. 1).

The local permission identifier L_key is used by a network interface card of a local device (for example, the first device) to access a local memory (for example, the address indicated by the first SG list). The remote permission identifier R_key is used by a network interface card provided for the remote device (for example, the second device) to allow the network interface card of the remote device to remotely access a local memory (for example, the address indicated by the first SG list) during the RDMA operation.

The network interface card of the first device may store the permission identifier key and the first entry in a memory of the network interface card in an associated manner. For example, the memory of the network interface card may be the internal memory 223 of the network interface card shown in FIG. 2.

The address permission table and the permission identifier key are mainly used to perform address verification during the DMA access. Details are described in the following, and details are not described herein.

S303: The network interface card of the first device generates a first request packet, where the first request packet includes information in the first command.

S304: The network interface card of the first device sends the first request packet to the network interface card of the second device.

After generating the first entry, the network interface card of the first device parses out that the first command is an I/O read command, and then obtains the first destination address information, the size of the first data, and the first SG list that are in the first command, obtains the generated permission identifier key, and encapsulates the obtained information into the first request packet. The first request packet may be an RDMA send packet, and the RDMA send packet is an I/O read packet. Then, the network interface card of the first device sends the first request packet to the network interface card of the second device by using the send queue SQL After the sending is completed, the network interface card of the first device may send, to the host of the first device by using the completion queue CQ1, a send completion notification.

The permission identifier key is added to the first request packet, and the permission identifier key is sent to the network interface card of the second device. It is equivalent to that operation permission for the first storage address is granted to the network interface card of the second device. In other words, the network interface card of the second device may initiate an RDMA write operation on the first storage address based on the permission identifier key.

It should be noted that, for the network interface card of the first device, the permission identifier key is the local permission identifier L_key. Therefore, in the first request packet, a value of the permission identifier key is written into a position of a value corresponding to a L_key field.

S305: The network interface card of the second device receives the first request packet, and parses out that the first request packet is a data read packet.

The network interface card of the second device receives the first request packet by using the foregoing created receive queue RQ2, and the receive operation may be referred to as RDMA receive. After the receiving is completed, the network interface card of the second device may send a receive completion notification to a host of the second device by using the completion queue CQ2, that is, notifies the host of the second device that the first request packet is received.

Then, the network interface card of the second device parses the first request packet to learn that the packet is the I/O read packet, and obtains the first destination address information, the size of the first data, the first SG list, and the permission identifier key that are in the first request packet.

S306: The network interface card of the second device reads the first data based on the first request packet, and encapsulates the read data and the first storage address in the first request packet into a first response packet.

The network interface card of the second device reads the first data from the corresponding storage address based on the obtained first destination address information and the size of the first data, and encapsulates the first data, the obtained first SG list, and the permission identifier key into the first response packet. The first response packet may be an RDMA write packet.

It should be noted that, for the network interface card of the second device, the permission identifier key is the remote permission identifier R_key. Therefore, in the first response packet, a value of the permission identifier key is written into a position of a value corresponding to an R_key field.

S307: The network interface card of the second device sends the first response packet to the network interface card of the first device.

After obtaining the first response packet through the encapsulation, the network interface card of the second device sends the first response packet to the network interface card of the first device by using the created send queue SQ2.

S308: The network interface card of the first device receives the first response packet, and initiates, based on the first response packet, the DMA on the first storage address to write the first data to the memory area to which the first storage address points, where the first data does not need to pass through the memory of the network interface card.

The network interface card of the first device receives the first response packet by using the created receive queue RQ1, and parses the first response packet to obtain the first data, the first SG list, and the remote permission identifier R_key (the R_key is the permission identifier key) that are in the packet.

Then, the network interface card of the first device indexes to the first entry in the address permission table by using the R_key, and then compares whether the address indicated by the first SG list falls within the address range included in the first entry.

If the address indicated by the first SG list falls within the address range included in the first entry, the network interface card of the first device initiates the DMA operation to an address included in the first SG list to write the first data obtained from the first response packet into the address area indicated by the first SG list. The DMA may be initiated to the address indicated by the first SG list by using the hardware component in the network interface card of the first device. The hardware component may be, for example, the hardware component 221 shown in FIG. 2.

Certainly, the first entry can be indexed only when the R_key is correct. Otherwise, the first entry cannot be indexed, and the network interface card of the first device cannot initiate the DMA to access the address indicated by the first SG list.

In this application, after obtaining the first data, the network interface card of the first device may directly initiate the DMA access to the first storage address to write the first data into the first storage address, and does not need to first cache the first data in the memory of the network interface card. Therefore, bandwidth resource usage and storage space usage that are of a memory of the network interface card of the first device can be reduced, the bandwidth resource usage and the storage space usage of the memory of the network interface card are improved, and a data transmission delay is significantly reduced.

S309: The network interface card of the first device sends, to the network interface card of the second device, a write completion notification of the first data.

S310: The network interface card of the second device sends an I/O read completion message to the network interface card of the first device based on the write completion notification.

S311: The network interface card of the first device deletes the first storage address in the address permission table based on the I/O read completion message, and sends the I/O read completion message to the host.

After the DMA is performed on the first data to write the first data into the first storage address, the network interface card of the first device sends, to the network interface card of the second device by using the send queue SQ1, the write completion notification of the first data. The network interface card of the second device receives the notification by using the receive queue RQ2, and learns that the network interface card of the first device has successfully read and written the first data. Then, the network interface card of the second device sends the I/O read completion message to the network interface card of the first device by using the send queue SQ2. The network interface card of the first device receives the I/O read completion message by using the receive queue RQ1, and deletes, based on the message, the address that is of the memory block and that is included in the first SG list in the address permission table, to release storage space of the memory block. Then, the network interface card of the first device sends the I/O read completion message to the host of the first device, so that the host perceives that I/O read is completed.

Embodiment 2

In a possible implementation, the memory area to which the first storage address points in Embodiment 1 may be a memory area of a virtual machine (VM) in the first device. A memory of the virtual machine is a memory that is obtained after the host of the first device virtualizes a physical memory of the host and that is allocated to the virtual machine for use. In other words, the memory of the virtual machine may be associated with the virtual machine. Alternatively, the memory of the virtual machine may be a physical memory. In other words, the physical memory is directly associated with the virtual machine for use by the virtual machine.

Each virtual machine may be associated with one or more memory areas, and a memory area corresponding to each virtual machine may be distinguished by using a memory identification. In addition, these identifications can be associated with corresponding virtual machines for mapping.

In a possible implementation, if the one or more memory areas are physical memory areas, an identification of the physical memory area may be referred to as a physical function identification PFID.

In a possible implementation, if the one or more memory areas are virtual memory areas, and if the virtual memory area is a memory area obtained through virtualization based on an SR-IOV technology, an identification of the virtual memory area may be referred to as a virtual function identification (VFID). Optionally, each virtual function may correspond to one virtual network interface card. In other words, an identification of a memory area managed by one virtual network interface card may be a VFID. If the virtual memory area is a memory area obtained through virtualization based on a scalable IOV technology, the identification of the virtual memory area may be referred to as an assignable device interface identification (ADIID).

For descriptions of a physical function, a virtual function, and an assignable device interface, refer to the description of the fourth point in the foregoing concept description. Details are not described herein again.

In a possible implementation, the virtual memory area may also be distinguished by using a process, and the identification of the virtual memory area may be referred to as a process address space identification (PASID).

In a possible implementation, the virtual memory area may also be distinguished by using different virtual machines, and the identification of the virtual memory area may be referred to as a virtual machine identification (VMID).

In a possible implementation, the identification of the virtual memory area may be directly referred to as an address space identification (ASID) or the like.

The foregoing division or naming of the identifications of the memory areas associated with the virtual machine is merely an example, and this is not limited in this solution.

In the following implementation examples, the PFID, the VFID, the PASID, the VMID, or the ASID is collectively referred to as a virtual machine memory identification. The virtual machine memory identification is mainly used to distinguish the memory area of the VM. These virtual machine memory identifications are planned and stored in the first device when the memory area is configured for the virtual machine.

It is assumed that the address indicated by the first SG list, namely, the virtual machine memory identification corresponding to the first storage address, may be referred to as a first virtual machine memory identification. Therefore, the first command, the first request packet, and the first response packet further include the first virtual machine memory identification. Storage space corresponding to the first storage address may be accurately found by using the first virtual machine memory identification.

Optionally, the first virtual machine memory identification may include one or more identifications. For example, if the first storage address is in a range of one memory area of the virtual machine, the first virtual machine memory identification may be an identification of the one memory area. If the first storage address includes addresses in a plurality of memory areas of the virtual machine, the first virtual machine memory identification may be identifications of the plurality of memory areas.

The first storage address includes addresses of n memory blocks of the VM, and the n memory blocks may be memory blocks in the one memory area of the virtual machine, or the n memory blocks may include memory blocks in the plurality of memory areas of the virtual machine. To enable the network interface card of the first device to accurately access then memory blocks of the VM, the first command may further include virtual machine memory identifications of memory areas in which then memory blocks of the VM are located, in other words, include the first virtual machine memory identification.

In an implementation of this application, the virtual machine memory identification may be used to replace the permission identifier key. In other words, the virtual machine memory identification is used as an index for the network interface card of the first device to access the address permission table. In step S302, the network interface card of the first device associates the first virtual machine memory identification with the first entry that includes the address indicated by the first SG list.

A value written into the L_key field in the first request packet is the first virtual machine memory identification, and a value written into the R_key field in the first response packet is also the first virtual machine memory identification. For ease of understanding, refer to FIG. 4A and FIG. 4B.

Figure 4A:
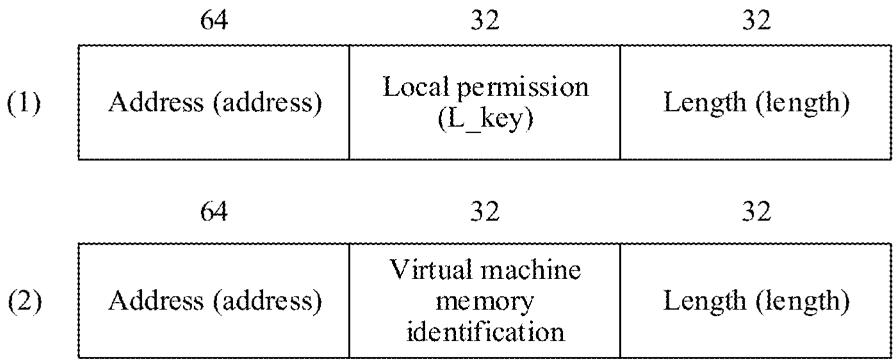
FIG. 4A is a schematic structural diagrams of a packet according to an embodiment of this application.

FIG. 4A(1) shows an address (address) field, a local permission (L_key) field, and a length (length) field that are included in the foregoing first request packet in an existing protocol. The address field occupies 64 bytes, the L_key field occupies 32 bytes, and the length field occupies 32 bytes. The address field is used to write a value of a start address of each of the n memory blocks of the VM. The length field is used to write a value of a length of each of the n memory blocks of the VM. The L_key field may be used to write a value of the access permission L_key used to access the n memory blocks. However, in an implementation of this application, the L_key field may be used to write a virtual machine memory identification of a memory area in which each of the n memory blocks of the VM is located, as shown in FIG. 4A(2).

Figure 4B:
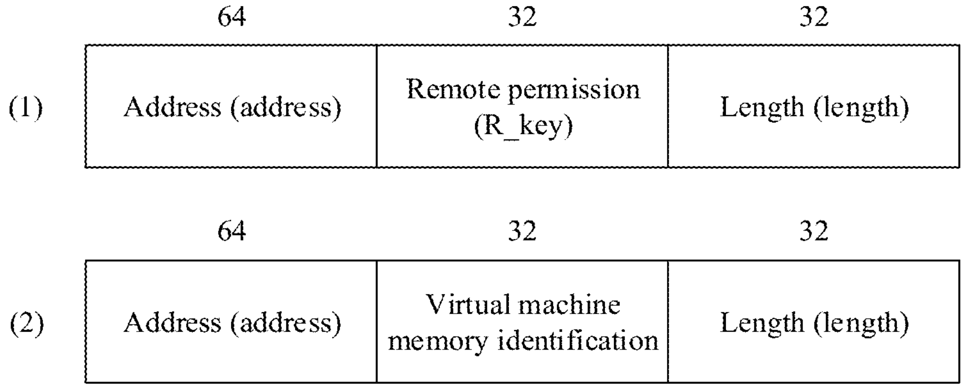
FIG. 4B is a schematic structural diagram of a packet according to an embodiment of this application.

FIG. 4B(1) shows an address (address) field, a remote permission (R_key) field, and a length (length) field that are included in the first response packet in an existing protocol. Similarly, the address field occupies 64 bytes, the R_key field occupies 32 bytes, and the length field occupies 32 bytes. The address field is used to write a value of a start address of each of the n memory blocks of the VM. The length field is used to write a value of a length of each of the n memory blocks of the VM. The R_key field may be used to write a value of the access permission R_key used by the network interface card of the second device to access the n memory blocks. However, in an implementation of this application, the R_key field may be used to write a virtual machine memory identification of a memory area in which each of the n memory blocks of the VM is located, as shown in FIG. 4B(2).

After receiving the first response packet, the network interface card of the first device may parse the first response packet to obtain the first data, the first SG list, and the virtual machine memory identifications, namely, the first virtual machine memory identification, of the memory areas in which the n memory blocks of the VM are located that are in the packet. Certainly, the first SG list includes the start address and the length of each of then memory blocks of the VM.

Then, the network interface card of the first device indexes the first entry by using the first virtual machine memory identification, and then compares whether the address indicated by the first SG list falls within the address range included in the first entry.

If the address indicated by the first SG list falls within the address range included in the first entry, the network interface card of the first device obtains the first virtual machine memory identification and the address included in the first SG list. Because the first virtual machine memory identification may be mapped to a corresponding physical address area, the address included in the first SG list can be accurately found only when the corresponding physical address area is found. Then, the network interface card of the first device initiates, based on the first virtual machine memory identification and the first SG list, the DMA operation to the address included in the first SG list to write the first data obtained from the first response packet into the address that is in the first SG list and that is indicated by the first virtual machine memory identification. The DMA may be initiated to the address indicated by the first SG list by using the hardware component in the network interface card of the first device. The hardware component may be, for example, the hardware component 221 shown in FIG. 2. For specific implementation of other operations, refer to the description of the method shown in FIG. 3. Details are not described herein again.

In a possible implementation, after receiving the first response packet, the network interface card of the first device may not check whether the address indicated by the first SG list in the first response packet falls within the address range included in the first entry, and may directly initiate the DMA operation based on the first virtual machine memory identification in the first response packet and the address included in the first SG list to write the first data obtained from the first response packet into the address that is in the first SG list and that is indicated by the first virtual machine memory identification.

Figure 5A:
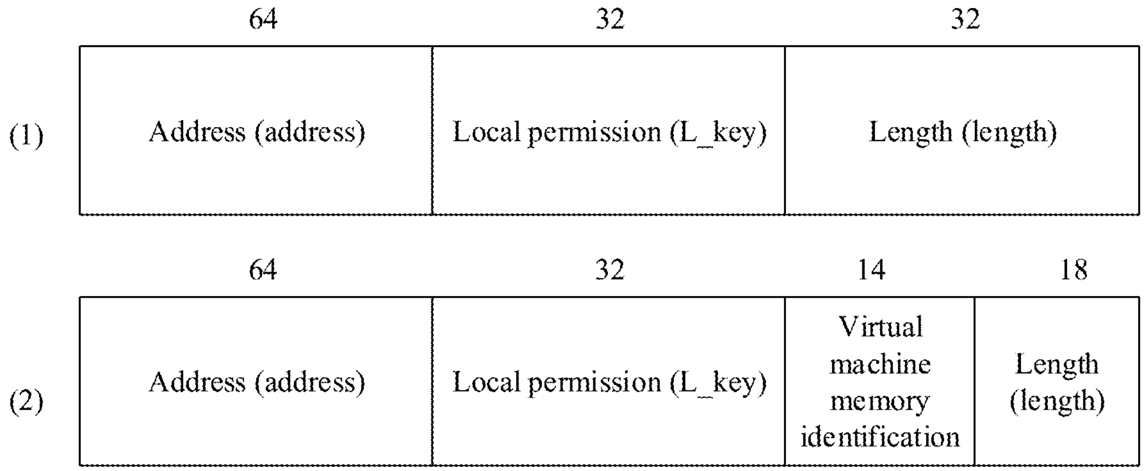
FIG. 5A is a schematic structural diagrams of another packet according to an embodiment of this application.

In a possible implementation, values of the virtual machine memory identifications in the first request packet and the first response packet are not limited to being written into positions shown in FIG. 4A and FIG. 4B. Write positions of the virtual machine memory identifications of the memory areas in which the n memory blocks of the VM are located in the first request packet and the first response packet may further include the following several cases:

In a first case, a virtual machine memory identification field is added to some bytes in the length field of the first request packet and the length field of the first response packet. Refer to FIG. 5A and FIG. 5B.

FIG. 5A(1) shows an address (address) field, a local permission (L_key) field, and a length (length) field that are included in the foregoing first request packet in an existing protocol. For descriptions of the address field, the L_key field, and the length field, refer to the foregoing descriptions of in FIG. 4A(1). Details are not described herein again. In an implementation of this application, the some bytes in the length field may be allocated as space of the virtual machine memory number field, and the bytes may be used to place values of the virtual machine memory number identifications of the memory areas in which then memory blocks of the VM are located. For example, referring to FIG. 5A(2), 14 high-order bytes in the length field of 32 bytes may be divided and used as the space of the virtual machine memory identification field, and the remaining 18 bytes are still used as space of the length field. In other words, the values of the virtual machine memory identifications of the memory areas in which the n memory blocks of the VM are located may be written into the 14 bytes, and the value of the length of each of the n memory blocks of the VM is written into the 18 bytes.

It should be noted that a quantity of bytes obtained through division from the length field is not limited to 14 bytes, and may alternatively be 12 bytes, 10 bytes, or the like. A specific quantity of bytes obtained through division is not limited in this solution. In addition, a quantity of bytes obtained through division from the length field is not limited to being divided from a high-order byte, and may also be divided from a low-order byte.

FIG. 5B(1) shows an address (address) field, a remote permission (R_key) field, and a length field that are included in the foregoing first request packet in an existing protocol. For descriptions of the address field, the R_key field, and the length field, refer to the foregoing descriptions of in FIG. 4B(1). Details are not described herein again. In an implementation of this application, the some bytes in the length field may be allocated as space of the virtual machine memory number field, and the bytes may be used to place values of the virtual machine memory number identifications in which the n memory blocks of the VM are located. For example, referring to FIG. 5B(2), 14 high-order bytes in the length field of 32 bytes may be divided and used as the space of the virtual machine memory identification field, and the remaining 18 bytes are still used as space of the length field. In other words, the values of the virtual machine memory identifications of the memory areas in which the n memory blocks of the VM are located may be written into the 14 bytes, and the value of the length of each of then memory blocks of the VM is written into the 18 bytes.

It should be noted that a quantity of bytes obtained through division from the length field is not limited to 14 bytes, and may alternatively be 12 bytes, 10 bytes, or the like. A specific quantity of bytes obtained through division is not limited in this solution. In addition, a quantity of bytes obtained through division from the length field is not limited to being divided from a high-order byte, and may also be divided from a low-order byte.

Figure 6B:
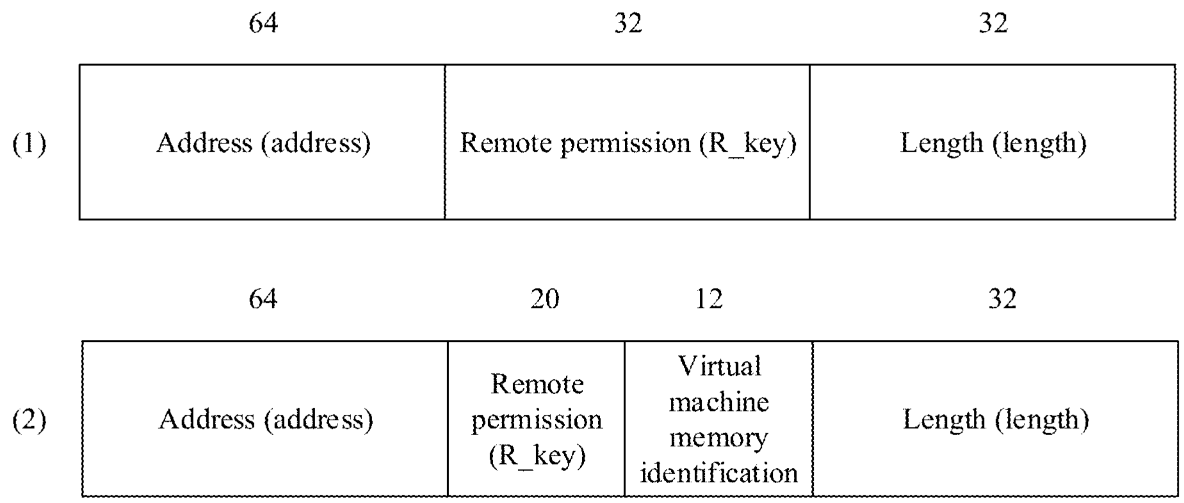
FIG. 6B is a schematic structural diagram of another packet according to an embodiment of this application.

In a second case, a virtual machine memory identification field is added to some bytes in the L_key field of the first request packet and the R_key field of the first response packet. Refer to FIG. 6A and FIG. 6B.

FIG. 6A(1) shows an address (address) field, a local permission (L_key) field, and a length (length) field that are included in the foregoing first request packet in an existing protocol. For descriptions of the address field, the L_key field, and the length field, refer to the foregoing descriptions of in FIG. 4A(1). Details are not described herein again. In an implementation of this application, the some bytes in the L_key field may be allocated as space of the virtual machine memory number field, and the bytes may be used to place values of the virtual machine memory number identifications of the memory areas in which then memory blocks of the VM are located. For example, referring to FIG. 6A(2), 12 low-order bytes in the L_key field of 32 bytes may be divided and used as the space of the virtual machine memory identification field, and the remaining 20 bytes are still used as space of the L_key field. In other words, the values of the virtual machine memory identifications of the memory areas in which the n memory blocks of the VM are located may be written into the 12 bytes, and the value of the L_key of then memory blocks of the VM is written into the 20 bytes.

It should be noted that a quantity of bytes obtained through division from the L_key field is not limited to 12 bytes, and may alternatively be 14 bytes, 10 bytes, or the like. A specific quantity of bytes obtained through division is not limited in this solution. In addition, a quantity of bytes obtained through division from the L_key field is not limited to being divided from a low-order byte, and may also be divided from a high-order byte.

FIG. 6B(2) shows an address (address) field, a remote permission (R_key) field, and a length (length) field that are included in the foregoing first request packet in an existing protocol. For descriptions of the address field, the R_key field, and the length field, refer to the foregoing descriptions of in FIG. 4B(1). Details are not described herein again. In an implementation of this application, the some bytes in the R_key field may be allocated as space of the virtual machine memory number field, and the bytes may be used to place values of the virtual machine memory number identifications of the memory areas in which then memory blocks of the VM are located. For example, referring to FIG. 6B(2), 12 low-order bytes in the R_key field of 32 bytes may be divided and used as the space of the virtual machine memory identification field, and the remaining 20 bytes are still used as space of the R_key field. In other words, the values of the virtual machine memory identifications of the memory areas in which then memory blocks of the VM are located may be written into the 12 bytes, and the value of the R_key of the n memory blocks of the VM is written into the 20 bytes.

It should be noted that a quantity of bytes obtained through division from the R_key field is not limited to 12 bytes, and may alternatively be 14 bytes, 10 bytes, or the like. A specific quantity of bytes obtained through division is not limited in this solution. In addition, a quantity of bytes obtained through division from the L_key field is not limited to being divided from a low-order byte, and may also be divided from a high-order byte.

Figure 7A:
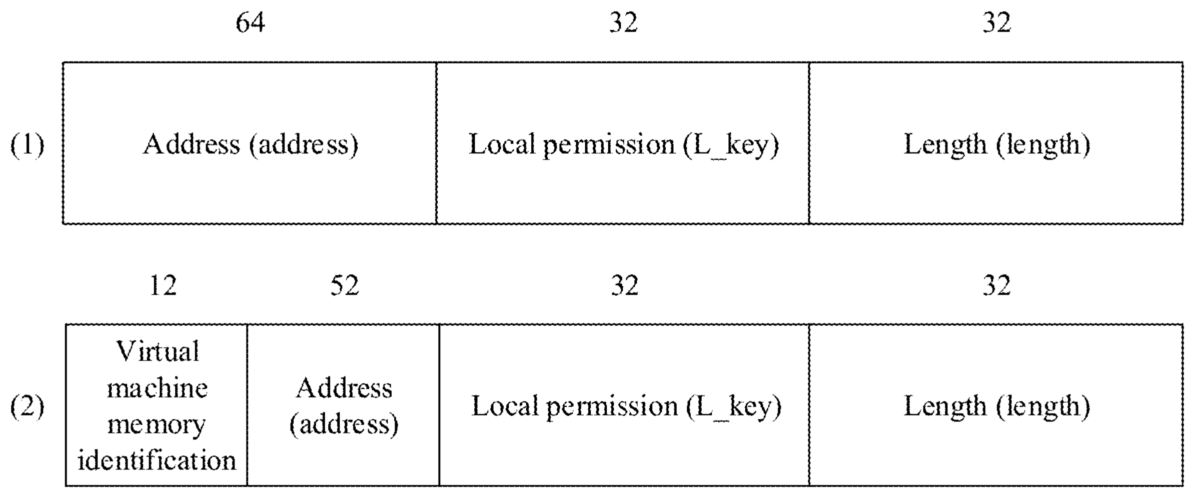
FIG. 7A is a schematic structural diagrams of another packet according to an embodiment of this application.
Figure 7B:
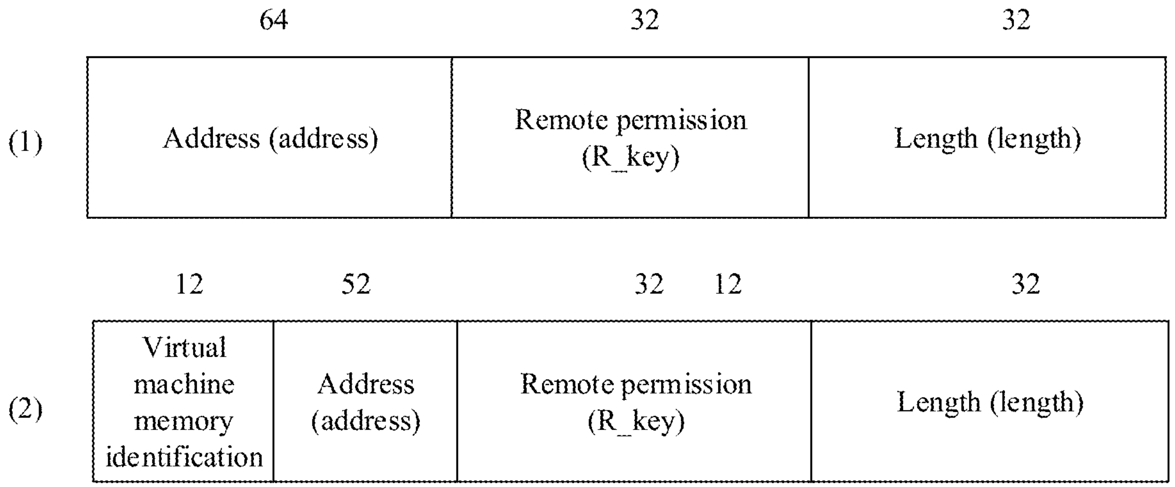
FIG. 7B is a schematic structural diagram of another packet according to an embodiment of this application.

In a third case, a virtual machine memory identification field is added to some bytes in the address field of the first request packet and the address field of the first response packet. Refer to FIG. 7A and FIG. 7B.

FIG. 7A(1) shows an address (address) field, a local permission (L_key) field, and a length (length) field that are included in the foregoing first request packet in an existing protocol. For descriptions of the address field, the L_key field, and the length field, refer to the foregoing descriptions of in FIG. 4A(1). Details are not described herein again. In an implementation of this application, the some bytes in the address field may be allocated as space of the virtual machine memory number field, and the bytes may be used to place values of the virtual machine memory number identifications of the memory areas in which then memory blocks of the VM are located. For example, referring to FIG. 7A(2), 12 high-order bytes in the address field of 64 bytes may be divided and used as the space of the virtual machine memory identification field, and the remaining 52 bytes are still used as space of the address field. In other words, the values of the virtual machine memory identifications of the memory areas in which then memory blocks of the VM are located may be written into the 12 bytes, and the value of the start address of each of then memory blocks of the VM is written into the 52 bytes.

It should be noted that a quantity of bytes obtained through division from the address field is not limited to 12 bytes, and may alternatively be 14 bytes, 10 bytes, or the like. A specific quantity of bytes obtained through division is not limited in this solution. In addition, a quantity of bytes obtained through division from the address field is not limited to being divided from a high-order byte, and may also be divided from a low-order byte.

FIG. 7B(2) shows an address (address) field, a remote permission (R_key) field, and a length (length) field that are included in the foregoing first request packet in an existing protocol. For descriptions of the address field, the R_key field, and the length field, refer to the foregoing descriptions of in FIG. 4B(1). Details are not described herein again. In an implementation of this application, the some bytes in the address field may be allocated as space of the virtual machine memory number field, and the bytes may be used to place values of the virtual machine memory number identifications of the memory areas in which then memory blocks of the VM are located. For example, referring to FIG. 7B(2), 12 high-order bytes in the address field of 64 bytes may be divided and used as the space of the virtual machine memory identification field, and the remaining 52 bytes are still used as space of the address field. In other words, the values of the virtual machine memory identifications of the memory areas in which then memory blocks of the VM are located may be written into the 14 bytes, and the value of the start address of each of then memory blocks of the VM is written into the 52 bytes. It should be noted that a quantity of bytes obtained through division from the address field is not limited to 12 bytes, and may alternatively be 14 bytes, 10 bytes, or the like. A specific quantity of bytes obtained through division is not limited in this solution. In addition, a quantity of bytes obtained through division from the address field is not limited to being divided from a high-order byte, and may also be divided from a low-order byte.

It should be noted that, in the foregoing three cases, the first response packet not only includes the permission identifiers key of the n memory blocks, but also includes the virtual machine memory identifications of the memory areas in which the n memory blocks are located. In this case, when it is checked whether the address of the first SG list in the first response packet falls within the range of the address permission table, one of, for example, the permission identifiers key of the n memory blocks or the virtual machine memory identifications of the memory areas in which the n memory blocks are located may be selected as an index of an entry of the address permission table. This may be determined according to an actual situation and is not limited in this solution.

Embodiment 3

Figure 8:
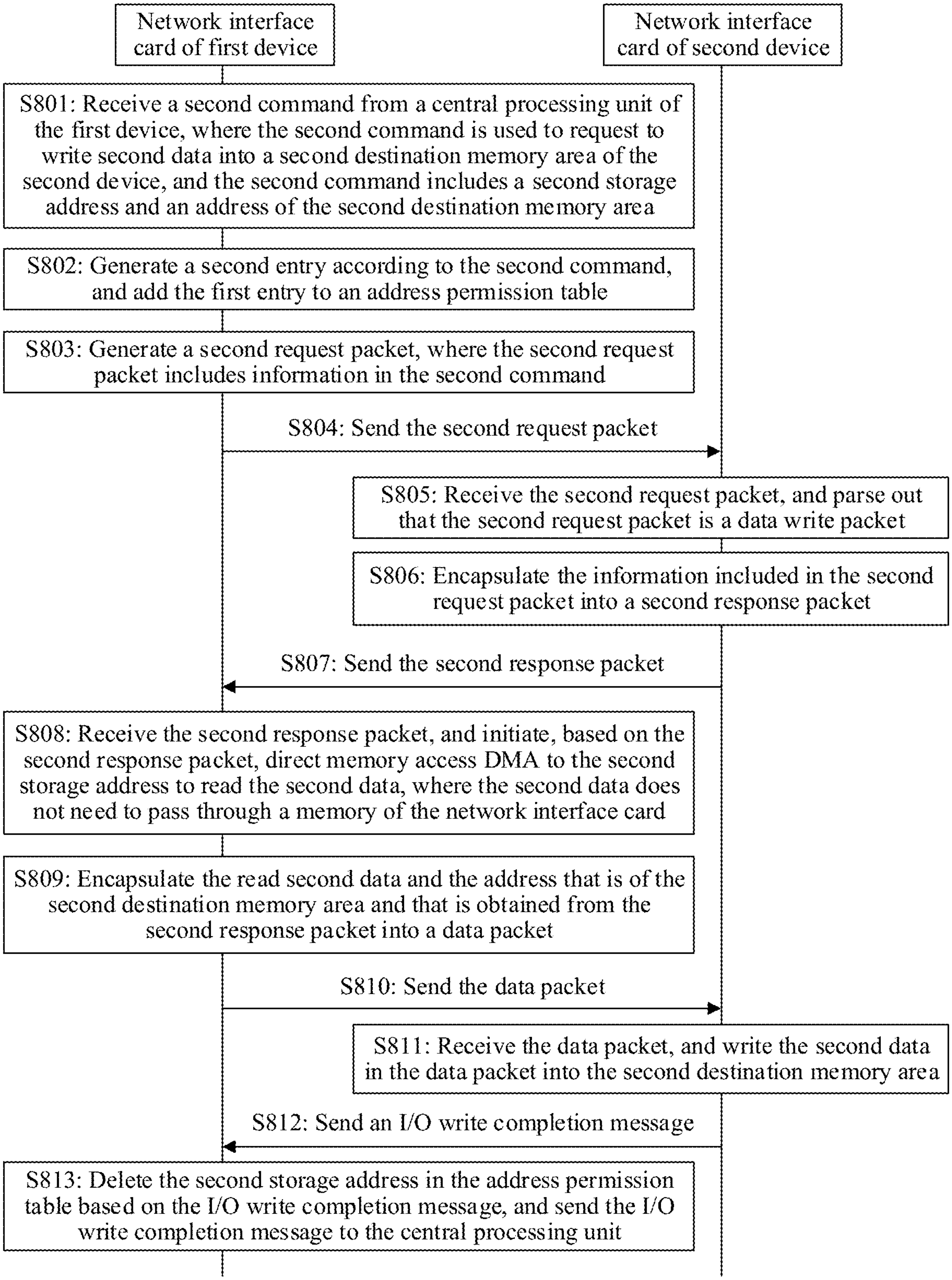
FIG. 8 is a schematic flowchart of another data processing method according to an embodiment of this application.

The following describes another data processing method provided in an embodiment of this application: a data processing method in which a first device writes data into a memory of a second device. Referring to FIG. 8, the method may be implemented based on the scenario shown in FIG. 1 and the structure shown in FIG. 2 or another scenario and structure. The method may include but is not limited to the following steps.

S801: A network interface card of a first device receives a second command from a host of the first device, where the second command is used to request to write second data into a second destination storage area of a second device, and the second command includes a second storage address and an address of the second destination storage area.

A memory area to which the second storage address points is used to store the second data, and the memory area to which the second storage address points belongs to a memory area of the host of the first device.

For example, the first device may be the first device 101 shown in FIG. 1, the host may be the host 210 shown in FIG. 2, and the network interface card may be the network interface card 220 shown in FIG. 2.

In an example embodiment, before the network interface card of the first device receives the second command from the host of the first device, a queue pair QP for performing RDMA communication is created between the network interface card of the first device and a network interface card of the second device.

The network interface card of the first device and the network interface card of the second device create respective queue pairs. In other words, the network interface card of the first device creates a send queue SQ1' and a receive queue RQ1' that are of the first device. The network interface card of the second device creates a send queue SQ2' and a receive queue RQ2' that are of the second device. In addition, the network interface card of the first device further creates a completion queue CQ1', configured to send an instruction completion notification. Similarly, the network interface card of the second device also creates a completion queue CQ2', configured to send an instruction completion notification.

A message sent by the send queue SQ1' of the network interface card of the first device is received by the receive queue RQ2' of the network interface card of the second device, and a message sent by the send queue SQ2' of the network interface card of the second device is received by the receive queue RQ1' of the network interface card of the first device. The completion queue CQ is mainly used to send operation completion notifications of RDMA send and RDMA receive. Similarly, operation completion notifications of RDMA read and RDMA write may also be sent by using the CQ.

After completing the operation of creating the queue pair, the host of the first device generates the second command in response to a received instruction that is of storing data and that is input by a user. The received instruction that is of storing the data and that is input by the user may be, for example, a storage operation or an upload operation on a file. A specific instruction for storing the data is not limited in this solution.

Then, the host of the first device sends the second command to the interface card of the first device. The host places the second command in the created send queue SQ1'. Then, the network interface card receives the second command by using a hardware component (for example, the hardware component 221 shown in FIG. 2) of the network interface card.

The second command may be an input/output (I/O) write command. The second command may include second destination address information, a size of the second data, and a second SG list.

The second destination address information is the address of the second destination storage area, and may include destination storage volume information and written storage address information. The destination storage volume information is an identification of a storage volume of the second device, and the storage volume is a storage volume into which the second data is written. The written storage address information refers to a start address for storing the second data in the storage volume.

The size of the second data is a size of a data volume of to-be-written second data. For example, the size of the second data may be 512 megabytes.

The second SG list is used to indicate a storage position of the second data in the first device. In other words, the second SG list indicates the second storage address. The memory area to which the second storage address points may include m1 (m1 is an integer greater than or equal to 1) memory blocks, and the m1 memory blocks together constitute all memory space occupied by the second data. Therefore, the second SG list may include address information of the ml memory blocks. The second SG list may include a start address and a length of each of the ml memory blocks. The length of the memory block refers to a size of the memory block. For example, if the size of the memory block is 512 bytes, it may be considered that the length of the memory block is 512 bytes.

S802: The network interface card of the first device generates a second entry according to the second command, and adds the first entry to an address permission table.

After receiving the second command, the network interface card of the first device generates the second entry according to the second command. Content of the second entry includes an address range, and the address range includes an address indicated by the second SG list, in other words, includes the second storage address. Then, the network interface card of the first device adds the generated second entry to the address permission table. For a description of the address permission table, refer to the corresponding description in S302.

In addition, the network interface card of the first device further generates a permission identifier key' according to the second command, and associates the permission identifier key' with the second entry, so that the second entry can be indexed by using the permission identifier key'. In other words, the permission identifier key' is an index used by the network interface card of the first device to access the second entry.

It should be noted that the permission identifier key' is a local permission identifier L_key' for the network interface card of the first device, and the permission identifier key' is a remote permission identifier R_key' for the network interface card of the second device (the second device may be, for example, the second device 102 shown in FIG. 1).

The network interface card of the first device may store the permission identifier key' and the second entry in a memory of the network interface card in an associated manner. For example, the memory of the network interface card may be the internal memory 223 of the network interface card shown in FIG. 2.

Similarly, the address permission table and the permission identifier key' are mainly used to perform address verification during the DMA access. Details are described in the following, and details are not described herein.

S803: The network interface card of the first device generates a second request packet, where the second request packet includes information in the second command.

S804: The network interface card of the first device sends the second request packet to the network interface card of the second device.

After generating the second entry, the network interface card of the first device parses out that the second command is an I/O write command, obtains the second destination address information, the size of the second data, and the second SG list that are in the second command, obtains the generated permission identifier key', and encapsulates the obtained information into the second request packet. The second request packet may be an RDMA send packet, and the RDMA send packet is an I/O write packet. Then, the network interface card of the first device sends the second request packet to the network interface card of the second device by using the send queue SQ1'. After the sending is completed, the network interface card of the first device may send, to the host of the first device by using the completion queue CQ1', a send completion notification.

The permission identifier key' is added to the second request packet, and the permission identifier key' is sent to the network interface card of the second device. It is equivalent to that operation permission for the second storage address is granted to the network interface card of the second device. In other words, the network interface card of the second device may initiate an RDMA read operation on the second storage address based on the permission identifier key'.

It should be noted that, for the network interface card of the first device, the permission identifier key' is the local permission identifier L_key'. Therefore, in the second request packet, a value of the permission identifier key' is written into a position of a value corresponding to a L_key field.

S805: The network interface card of the second device receives the second request packet, and parses out that the second request packet is a data write packet.

The network interface card of the second device receives the second request packet by using the foregoing created receive queue RQ2', and the receive operation may be referred to as RDMA receive. After the receiving is completed, the network interface card of the second device may send a receive completion notification to a host of the second device by using the completion queue CQ2', in other words, notifies the host of the second device that the second request packet is received.

Then, the network interface card of the second device parses the second request packet to learn that the packet is the I/O write packet, and obtains the second destination address information, the size of the second data, the second SG list, and the permission identifier key' that are in the second request packet.

S806: The network interface card of the second device encapsulates the information included in the second request packet into a second response packet.

The network interface card of the second device obtains the second destination address information, the size of the second data, the second SG list, and the permission identifier key' that are in the second request packet, and encapsulates the information into the second response packet. The second response packet may be an RDMA read packet.

It should be noted that, for the network interface card of the second device, the permission identifier key' is the remote permission identifier R_key'. Therefore, in the second response packet, a value of the permission identifier key' is written into a position of a value corresponding to an R_key field.

S807: The network interface card of the second device sends the second response packet to the network interface card of the first device.

After obtaining the second response packet through the encapsulation, the network interface card of the second device sends the second response packet to the network interface card of the first device by using the created send queue SQ2.

S808: The network interface card of the first device receives the second response packet, and initiates, based on the second response packet, direct memory access DMA to the second storage address to read the second data, where the second data does not need to pass through the memory of the network interface card.

The network interface card of the first device receives the second response packet by using the created receive queue RQ1', and parses the second response packet to obtain the second destination address information, the size of the second data, the second SG list, and the remote permission identifier R_key' (the R_key' is the permission identifier key') that are in the packet.

Then, the network interface card of the first device indexes to the second entry in the address permission table by using the remote permission identifier R_key', and then compares whether the address indicated by the second SG list falls within the address range included in the second entry.

If the address indicated by the second SG list falls within the address range included in the second entry, the network interface card of the first device initiates the DMA operation to an address included in the second SG list, and reads the second data from the address indicated by the second SG list based on the size of the second data. The DMA may be initiated to the second storage address by using the hardware component in the network interface card of the first device. The hardware component may be, for example, the hardware component 221 shown in FIG. 2.

Certainly, the second entry can be indexed only when the remote permission identifier R_key' is correct. Otherwise, the second entry cannot be indexed, and the network interface card of the first device cannot initiate the DMA to access the address indicated by the second SG list.

In this application, the network interface card of the first device may directly initiate DMA access to the second storage address to read the second data, and does not need to first cache the second data in the memory of the network interface card. Therefore, bandwidth resource usage and storage space usage that are of the memory of the network interface card of the first device can be reduced, the bandwidth resource usage and the storage space usage that are of the memory of the network interface card are improved, and a data transmission delay is significantly reduced.

S809: The network interface card of the first device encapsulates the read second data and the address that is of the second destination storage area and that is obtained from the second response packet into a data packet.

S8010: The network interface card of the first device sends the data packet to the network interface card of the second device.

After reading the second data from the second storage address, the network interface card of the first device encapsulates the second data and the address of the second destination storage area into the data packet, and sends the data packet to the network interface card of the second device by using the created send queue SQ1'.

S811: The network interface card of the second device receives the data packet, and writes the second data in the data packet into the second destination storage area.

The network interface card of the second device receives the data packet by using the foregoing created RQ2', then parses the data packet to obtain the second data in the data packet and the address of the second destination storage area, and writes the second data into the second destination storage area.

S812: The network interface card of the second device sends an I/O write completion message to the network interface card of the first device.

S813: The network interface card of the first device deletes the second storage address in the address permission table based on the I/O write completion message, and sends the I/O write completion message to the host.

After the writing of the second data is completed, the network interface card of the second device sends the I/O write completion message to the network interface card of the first device by using the send queue SQ2'. The network interface card of the first device receives the I/O write completion message by using the receive queue RQ1, and deletes, based on the message, the address that is of the memory block and that is included in the second SG list in the address permission table, to release storage space of the memory block. Then, the network interface card of the first device sends the I/O write completion message to the host of the first device, so that the host perceives that I/O write is completed.

Embodiment 4

In a possible implementation, the memory area to which the second storage address points in Embodiment 3 may be a memory area of a virtual machine VM in the first device. For related descriptions of a memory of the virtual machine and a virtual machine memory identification, refer to the foregoing descriptions. Details are not described herein again.

It is assumed that the address indicated by the second SG list, namely, the virtual machine memory identification corresponding to the second storage address, may be referred to as a second virtual machine memory identification. Therefore, the second command, the second request packet, and the second response packet further include the second virtual machine memory identification. Storage space corresponding to the second storage address may be accurately found by using the second virtual machine memory identification.

Optionally, the second virtual machine memory identification may include one or more identifications. For example, if the second storage address is in a range of one memory area of the virtual machine, the second virtual machine memory identification may be an identification of the one memory area. If the second storage address includes addresses in a plurality of memory areas of the virtual machine, the second virtual machine memory identification may be identifications of the plurality of memory areas.

The second storage address includes addresses of m1 memory blocks of the VM, and the m1 memory blocks may be memory blocks in the one memory area of the virtual machine, or the m1 memory blocks may include memory blocks in the plurality of memory areas of the virtual machine. To enable the network interface card of the first device to accurately access the ml memory blocks of the VM, the second command may further include virtual machine memory identifications of memory areas in which the m1 memory blocks of the VM are located, in other words, include the second virtual machine memory identification.

In an implementation of this application, the virtual machine memory identification may be used to replace the permission identifier key'. In other words, the virtual machine memory identification is used as an index for the network interface card of the first device to access the address permission table. In step S802, the network interface card of the first device associates the second virtual machine memory identification with the second entry that includes the address indicated by the second SG list.

A value written into the L_key field in the second request packet is each of the virtual machine memory identifications of the memory areas in which the m1 memory blocks of the VM are located, and a value written into the R_key field in the second first response packet is also each of the virtual machine memory identifications of the memory areas in which the m1 memory blocks of the VM are located. For understanding of the description herein, refer to the foregoing description of FIG. 4A and FIG. 4B. Details are not described herein again.

After receiving the second response packet, the network interface card of the first device may parse the second response packet to obtain the second destination address information, the size of the second data, the second SG list, and the virtual machine memory identifications, namely, the second virtual machine memory identification, of the memory areas in which the ml memory blocks of the VM are located that are in the packet. Certainly, the second SG list includes the start address and the length of each of the m1 memory blocks of the VM.

Then, the network interface card of the first device indexes the second entry by using the second virtual machine memory identification, and then compares whether the address indicated by the second SG list falls within the address range included in the second entry.

If the address indicated by the second SG list falls within the address range included in the second entry, the network interface card of the first device obtains the second virtual machine memory identification and the address included in the second SG list. Because the second virtual machine memory identification may be mapped to a corresponding physical address area, the address included in the second SG list can be accurately found only when the corresponding physical address area is found. Then, the network interface card of the second device initiates, based on the second virtual machine memory identification and the second SG list, the DMA operation to the address included in the second SG list, and reads, based on the size of the second data, the second data from the address that is in the second SG list and that is indicated by the second virtual machine memory identification. The DMA may be initiated to the address indicated by the second SG list by using the hardware component in the network interface card of the second device. The hardware component may be, for example, the hardware component 221 shown in FIG. 2. For specific implementation of other operations, refer to the description of the method shown in FIG. 8. Details are not described herein again.

In a possible implementation, after receiving the second response packet, the network interface card of the first device may not check whether the address indicated by the second SG list in the second response packet falls within the address range included in the second entry, may directly initiate the DMA operation based on the second virtual machine memory identification in the second response packet and the address included in the second SG list, and reads, based on the size of the second data, the second data from the address that is in the second SG list and that is indicated by the second virtual machine memory identification.

In a possible implementation, values of the virtual machine memory identifications in the second request packet and the second response packet are not limited to being written into positions shown in FIG. 4A and FIG. 4B. Write positions of the virtual machine memory identifications of the memory areas in which the n memory blocks of the VM are located in the second request packet and the second response packet may further include the following several cases:

In a first case, a virtual machine memory identification field is added to some bytes in the length field of the second request packet and the length field of the second response packet. For specific descriptions, refer to FIG. 5A and FIG. 5B. Details are not described herein again.

In a second case, a virtual machine memory identification field is added to some bytes in the L_key field of the second request packet and the R_key field of the second response packet. For specific descriptions, refer to FIG. 6A and FIG. 6B. Details are not described herein again.

In a third case, a virtual machine memory identification field is added to some bytes in the address field of the second request packet and the address field of the second response packet. For specific descriptions, refer to FIG. 7A and FIG. 7B. Details are not described herein again.

Similarly, it should be noted that, in the foregoing three cases, the second response packet not only includes the permission identifiers key' of the m1 memory blocks, but also includes the virtual machine memory identifications of the memory areas in which the m1 memory blocks are located. In this case, when it is checked whether the address of the second SG list in the second response packet falls within the range of the address permission table, one of, for example, the permission identifiers key' of the m1 memory blocks or the virtual machine memory identifications of the memory areas in which the m1 memory blocks are located may be selected as an index of an entry of the address permission table. This may be determined according to an actual situation and is not limited in this solution.

Embodiment 5

Figure 9:
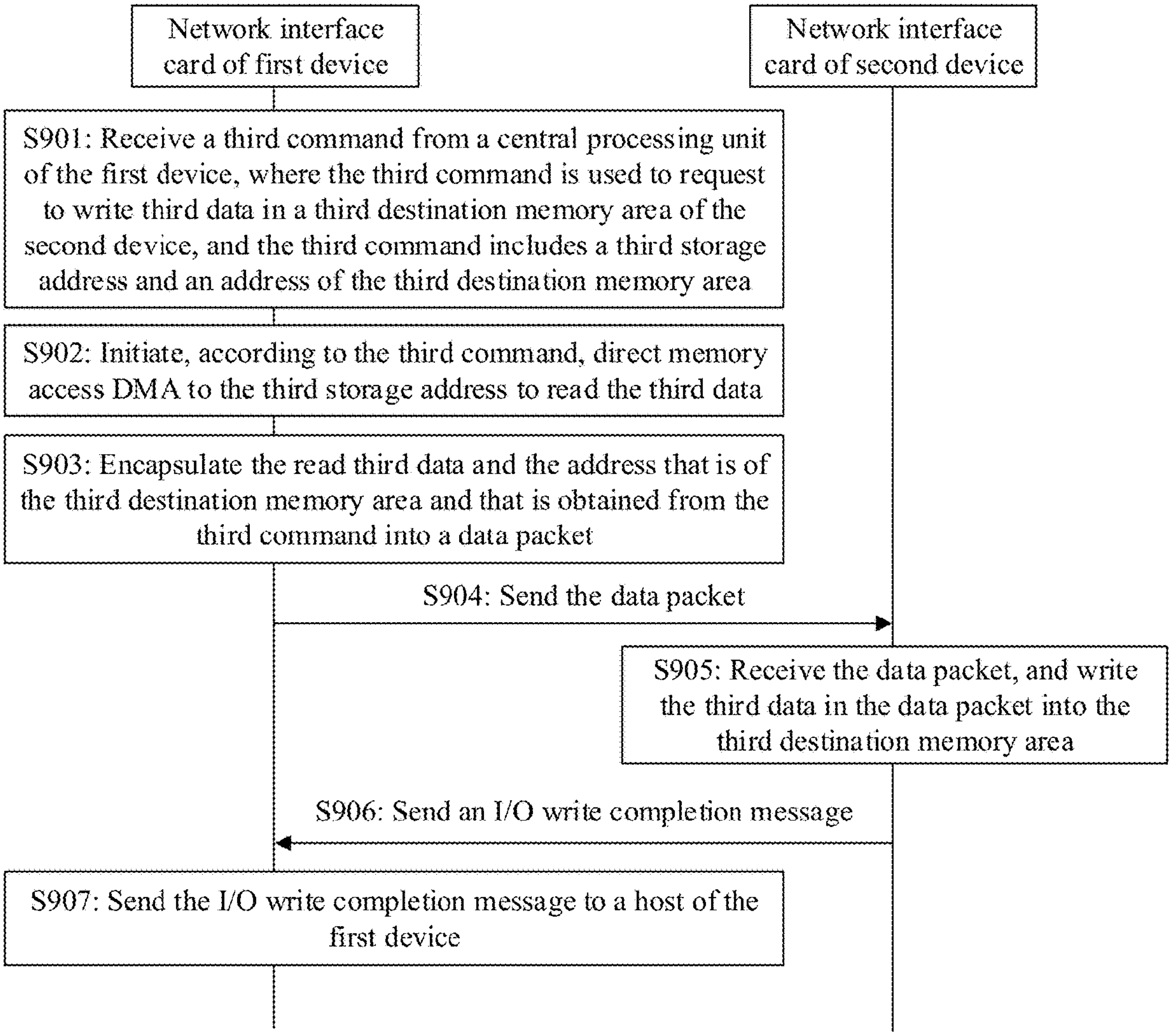
FIG. 9 is a schematic flowchart of another data processing method according to an embodiment of this application.

For a data processing method in which a first device writes data into a memory of a second device, this application further provides another possible implementation. Referring to FIG. 9, the method may be implemented based on the scenario shown in FIG. 1 and the structure shown in FIG. 2 or another scenario and structure. The method may include but is not limited to the following steps.

S901: A network interface card of a first device receives a third command from a host of the first device, where the third command is used to request to write third data in a third destination storage area of a second device, and the third command includes a third storage address and an address of the third destination storage area.

A memory area to which the third storage address points is used to store the third data, and the memory area to which the third storage address points belongs to a memory area of the host of the first device.

For example, the first device may be the first device 101 shown in FIG. 1, the host may be the host 210 shown in FIG. 2, and the network interface card may be the network interface card 220 shown in FIG. 2.

Similarly, in an example embodiment, before the network interface card of the first device receives the third command from the host of the first device, a queue pair QP for performing RDMA communication is created between the network interface card of the first device and a network interface card of the second device.

The network interface card of the first device and the network interface card of the second device create respective queue pairs. In other words, the network interface card of the first device creates a send queue SQ1" and a receive queue RQ1" that of the first device. The network interface card of the second device creates a send queue SQ2" and a receive queue RQ2" that of the second device. In addition, the network interface card of the first device further creates a completion queue CQ1", configured to send an instruction completion notification. Similarly, the network interface card of the second device also creates a completion queue CQ2", configured to send an instruction completion notification.

A message sent by the send queue SQ1" of the network interface card of the first device is received by the receive queue RQ2" of the network interface card of the second device, and a message sent by the send queue SQ2" of the network interface card of the second device is received by the receive queue RQ1" of the network interface card of the first device. The completion queue CQ is mainly used to send operation completion notifications of RDMA send and RDMA receive. Similarly, operation completion notifications of RDMA read and RDMA write may also be sent by using the CQ.

After completing the operation of creating the queue pair, the host of the first device generates the third command in response to a received instruction that is of storing data and that is input by a user. The received instruction that is of storing the data and that is input by the user may be, for example, a storage operation or an upload operation on a file. A specific instruction for storing the data is not limited in this solution.

Then, the host of the first device sends the third command to the network interface card of the first device. The host places the third command in the created send queue SQ1". Then, the network interface card receives the third command by using a hardware component (for example, the hardware component 221 shown in FIG. 2) of the network interface card.

The third command may be an input/output (I/O) write command. The third command may include third destination address information, a size of the third data, and a third SG list.

The third destination address information is the address of the third destination storage area, and may include destination storage volume information and written storage address information. The destination storage volume information is an identification of a storage volume of the second device, and the storage volume is a storage volume into which the third data is written. The written storage address information refers to a start address for storing the third data in the storage volume.

The size of the third data is a size of a data volume of to-be-written third data. For example, the size of the third data may be 512 megabytes.

The third SG list is used to indicate a storage position of the third data in the first device. In other words, the third SG list indicates the third storage address. The memory area to which the third storage address points may include m2 (m2 is an integer greater than or equal to 1) memory blocks, and the m2 memory blocks together constitute all memory space occupied by the third data. Therefore, the third SG list may include address information of the m2 memory blocks. The third SG list may include a start address and a length of each of the m2 memory blocks. The length of the memory block refers to a size of the memory block. For example, if the size of the memory block is 512 bytes, it may be considered that the length of the memory block is 512 bytes.

S902: The network interface card of the first device initiates, according to the third command, direct memory access DMA to the third storage address to read the third data.

In an example embodiment, the third command placed by the host of the first device in the send queue SQ1" may be in a form of a data descriptor.

After receiving the data descriptor sent by the host, the network interface card of the first device may initiate, based on the third SG list in the data descriptor, a DMA operation to an address included in the third SG list, and read the third data from the address indicated by the third SG list based on the size of the third data. The DMA may be initiated to the third storage address by using the hardware component in the network interface card of the first device. The hardware component may be, for example, the hardware component 221 shown in FIG. 2.

In a possible implementation, the third command may further include an identifier, and the identifier is used to indicate that the network interface card of the first device may read the third data from the third storage address, and then send the read third data to the network interface card of the second device. Therefore, after receiving the third command, the network interface card of the first device parses the command to obtain the identifier, identifies, by using the identifier, that the third data is to be first read from the third storage address, and then sends the read third data to the network interface card of the second device. For a specific operation of reading the third data, refer to the foregoing description. Details are not described herein again.

In this application, the network interface card of the first device may directly initiate DMA access to the third storage address to read the third data, and does not need to first cache the third data in the memory of the network interface card. Therefore, bandwidth resource usage and storage space usage that are of the memory of the network interface card of the first device can be reduced, the bandwidth resource usage and the storage space usage that are of the memory of the network interface card are improved, and a data transmission delay is significantly reduced.

S903: The network interface card of the first device encapsulates the read third data and the address that is of the third destination storage area and that is obtained from the third command into a data packet.

S904: The network interface card of the first device sends the data packet to the network interface card of the second device.

After reading the third data from the third storage address, the network interface card of the first device encapsulates the third data and the address of the third destination storage area into the data packet, and sends the data packet to the network interface card of the second device by using the created send queue SQ1".

S905: The network interface card of the second device receives the data packet, and writes the third data in the data packet into the third destination storage area.

The network interface card of the second device receives the data packet by using the foregoing created RQ2", then parses the data packet to obtain the third data in the data packet and the address of the third destination storage area, and writes the third data into the third destination storage area.

S906: The network interface card of the second device sends an I/O write completion message to the network interface card of the first device.

S907: The network interface card of the first device sends the I/O write completion message to the host of the first device.

After the writing of the third data is completed, the network interface card of the second device sends the I/O write completion message to the network interface card of the first device by using the send queue SQ2", and the network interface card of the first device sends the I/O write completion message to the host of the first device. In this way, the host can perceive that I/O write is completed.

In this embodiment of this application, compared with Embodiment 3, two interaction steps are reduced. One is that the network interface card of the first device sends a request packet for writing data into the second device, and the other is that the second device sends, to the network interface card of the first device based on the request packet, a response packet for reading the data. In this application, the network interface card of the first device directly reads data and sends the data to the second device, so that the second device writes the data into a destination storage area, thereby greatly improving data write efficiency and reducing a data write delay.

Embodiment 6

In a possible implementation, the memory area to which the third storage address points in Embodiment 5 may be a memory area of a virtual machine VM in the first device. For related descriptions of a memory of the virtual machine and a virtual machine memory identification, refer to the foregoing descriptions. Details are not described herein again.

It is assumed that the address indicated by the third SG list, namely, the virtual machine memory identification corresponding to the third storage address, may be referred to as a third virtual machine memory identification. Therefore, the third command further includes the third virtual machine memory identification. Storage space corresponding to the third storage address may be accurately found by using the third virtual machine memory identification.

Optionally, the third virtual machine memory identification may include one or more identifications. For example, if the third storage address is in a range of one memory area of the virtual machine, the third virtual machine memory identification may be an identification of the one memory area. If the third storage address includes addresses in a plurality of memory areas of the virtual machine, the third virtual machine memory identification may be identifications of the plurality of memory areas.

The third storage address includes addresses of m2 memory blocks of the VM, and the m2 memory blocks may be memory blocks in the one memory area of the virtual machine, or the m2 memory blocks may include memory blocks in the plurality of memory areas of the virtual machine. To enable the network interface card of the first device to accurately access the m2 memory blocks of the VM, the third command may further include virtual machine memory identifications of memory areas in which the m2 memory blocks of the VM are located, in other words, include the third virtual machine memory identification.

In an implementation of this application, in the step of initiating, by the network interface card of the first device according to the third command, the DMA to read the third data from the third storage address in S902, the network interface card of the first device reads the third data based on the address that is included in the third SG list and on which the DMA access is performed by the third virtual machine memory identification in the corresponding memory area.

It should be noted that, in the data processing methods in FIG. 3, FIG. 8, and FIG. 9 and possible implementations of the data processing methods, interaction between the first device and the second device implemented by using the queue pair QP and the completion queue CQ is merely an example. Alternatively, interaction between the first device and the second device may be implemented in another manner, to implement the foregoing data processing methods.

The foregoing mainly describes the data processing method provided in the embodiments of this application. It may be understood that, to implement the foregoing functions, each device includes corresponding hardware structures and/or software modules for performing corresponding functions. Persons skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. The persons skilled in the art may use different methods to implement the described functions for each particular application, but it should not be considered that the implementation goes beyond the scope of this application.

In the embodiments of this application, the device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in this embodiment of this application, division into modules is an example, and is merely a logical function division. In actual implementation, another division manner may be used.

Figure 10:
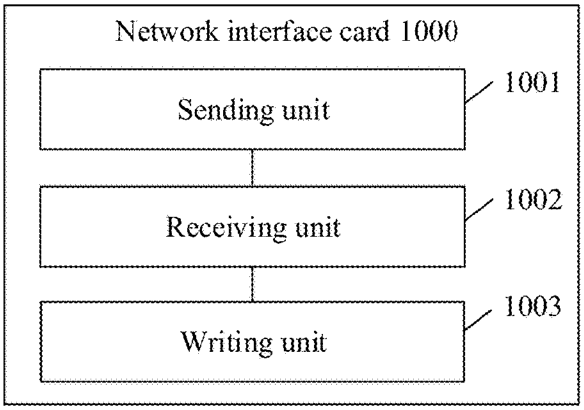
FIG. 10 is a schematic diagram of a logical structure of a network interface card according to an embodiment of this application.

When each function module is obtained through division based on each corresponding function, FIG. 10 is a schematic diagram of a possible logical structure of a device. The device may be the network interface card of the first device in the foregoing embodiments. The network interface card 1000 includes a sending unit 1001, a receiving unit 1002, and a writing unit 1003.

The sending unit 1001 is configured to send a first request packet to a second device. The first request packet is used to request to read first data, and the first data is stored in a first destination storage area of the second device.

The receiving unit 1002 is configured to receive a first response packet that is sent by the second device in response to the first request packet. The first response packet includes the first data.

The writing unit 1003 is configured to initiate, based on the first response packet, direct memory access DMA to a first storage address to write the first data into a memory area to which the first storage address points. The memory area to which the first storage address points belongs to a memory area of a host of the first device, and the first data does not need to be cached in a memory of the network interface card.

In a possible implementation, the first response packet includes a first virtual machine memory identification, the first virtual machine memory identification points to a first memory area configured by the host for a first virtual machine, and the first memory area includes the memory area to which the first storage address points. The writing unit 1003 is configured to find the memory area based on the first virtual machine memory identification, and initiate the DMA to the first storage address in the first memory area to write the first data into the memory area to which the first storage address points.

In a possible implementation, the network interface card further includes a querying unit, configured to: before that the writing unit 1003 writes the first data into the memory area to which the first storage address points, find, by using the first virtual machine memory identification as an index, that the memory area to which the first storage address points is in an address range included in an address permission table. The address permission table includes an address range in which the network interface card has permission to initiate the DMA access.

For specific operations and beneficial effects of the units in the network interface card 1000 shown in FIG. 10, refer to the descriptions of the method embodiment shown in Embodiment 1 or Embodiment 2 and the possible implementations of Embodiment 1 or Embodiment 2. Details are not described herein again.

Figure 11:
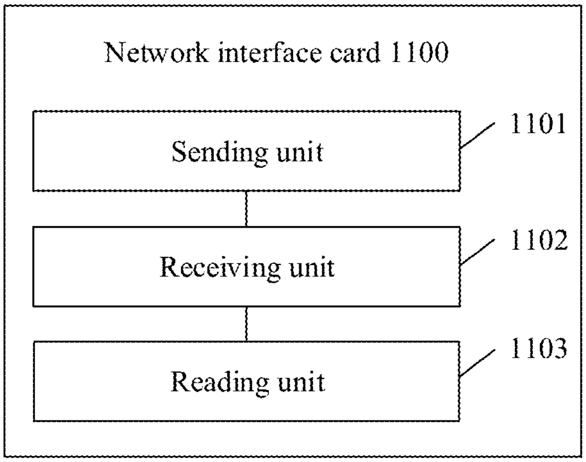
FIG. 11 is a schematic diagram of a logical structure of another network interface card according to an embodiment of this application.

When each function module is obtained through division based on each corresponding function, FIG. 11 is a schematic diagram of a possible logical structure of a device. The device may be the network interface card of the first device in the foregoing embodiments. The network interface card 1100 includes a sending unit 1101, a receiving unit 1102, and a reading unit 1103.

The sending unit 1101 is configured to send a second request packet to a second device. The second request packet is used to request to write second data into a second destination storage area of the second device, the second data is stored in a memory area to which a second storage address points, and the memory area to which the second storage address points belongs to a memory area of a host of the first device.

The receiving unit 1102 is configured to receive a second response packet that is sent by the second device in response to the second request packet, and the second response packet includes the second storage address.

The reading unit 1103 is configured to initiate, based on the second response packet, direct memory access DMA to the second storage address to read the second data.

The sending unit 1101 is further configured to send the read second data to the second device. The second data does not need to be cached in a memory of the network interface card.

In a possible implementation, the second response packet includes a second virtual machine memory identification, the second virtual machine memory identification points to a second memory area configured by the host for a second virtual machine, and the second memory area includes the memory area to which the second storage address points. The reading unit 1103 is configured to find, based on the second virtual machine memory identification, the second memory area, and initiate the DMA to the second storage address in the second memory area to read the second data.

In a possible implementation, the network interface card further includes a querying unit, configured to: before that the reading unit 1103 initiates, based on the second virtual machine memory identification, the DMA to the second storage address in the second memory area to read the second data, find, by using the second virtual machine memory identification as an index, that the memory area to which the second storage address points is in an address range included in an address permission table. The address permission table includes an address range in which the network interface card has permission to initiate the DMA access.

For specific operations and beneficial effects of the units in the network interface card 1100 shown in FIG. 11, refer to the descriptions of the method embodiment shown in Embodiment 3 or Embodiment 4 and the possible implementations of Embodiment 3 or Embodiment 4. Details are not described herein again.

Figure 12:
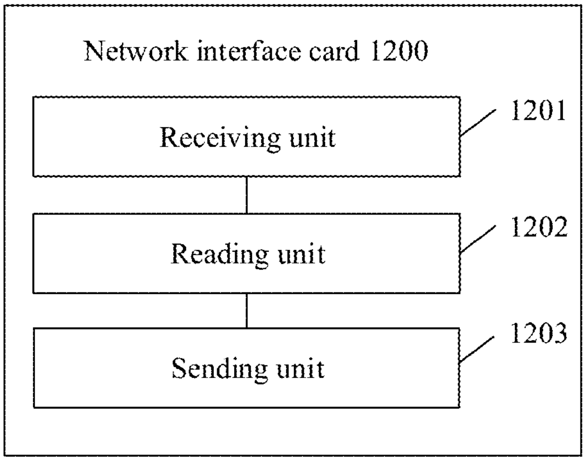
FIG. 12 is a schematic diagram of a logical structure of another network interface card according to an embodiment of this application.

When each function module is obtained through division based on each corresponding function, FIG. 12 is a schematic diagram of a possible logical structure of a device. The device may be the network interface card of the first device in the foregoing embodiments. The network interface card 1200 includes a receiving unit 1201, a reading unit 1202, and a sending unit 1203.

The receiving unit 1201 is configured to receive a third request from a processor of a host of the first device. The third request is used to request to write third data into a third destination storage area of a second device, and the third request includes a third storage address of the third data in a memory of the host of the first device.

The reading unit 1202 is configured to initiate, based on the third request, direct memory access DMA to the third storage address to read the third data.

The sending unit 1203 is configured to send the read third data to the second device. The third data does not need to pass through a memory of the network interface card.

In a possible implementation, the third request includes an identifier, and the identifier is used to indicate the network interface card to read the third data. The reading unit 1202 is configured to initiate, based on the identifier, the DMA to the third storage address to read the third data.

For specific operations and beneficial effects of the units in the network interface card 1200 shown in FIG. 12, refer to the descriptions of the method embodiment shown in Embodiment 5 or Embodiment 6 and the possible implementations of Embodiment 5 or Embodiment 6. Details are not described herein again.

An embodiment of this application further provides a computer-readable storage medium. The computer-readable storage medium stores a computer program, and the computer program is executed by a processor to implement the method in Embodiment 1 or Embodiment 2.

An embodiment of this application further provides a computer-readable storage medium. The computer-readable storage medium stores a computer program, and the computer program is executed by a processor to implement the method in Embodiment 3 or Embodiment 4.

An embodiment of this application further provides a computer-readable storage medium. The computer-readable storage medium stores a computer program, and the computer program is executed by a processor to implement the method in Embodiment 5 or Embodiment 6.

An embodiment of this application further provides a computer program product. When the computer program product is read and executed by a computer, the method in Embodiment 1 or Embodiment 2 is performed.

An embodiment of this application further provides a computer program product. When the computer program product is read and executed by a computer, the method in Embodiment 3 or Embodiment 4 is performed.

An embodiment of this application further provides a computer program product. When the computer program product is read and executed by a computer, the method in Embodiment 5 or Embodiment 6 is performed.

In conclusion, in this application, the network interface card of the first device may directly initiate the DMA access to the memory of the host of the first device to read/write data, and does not need to first cache the data in the memory of the network interface card. Therefore, the bandwidth resource usage and the storage space usage that are of the memory of the network interface card of the first device can be reduced, the bandwidth resource usage and the storage space usage that are of the memory of the network interface card are improved, and the data transmission delay is significantly reduced.

In the embodiments of this application, terms such as "first" and "second" are used to distinguish same items or similar items that have basically same functions. It should be understood that there is no logical or time sequence dependency between "first", "second", and "n$^{th}$" and a quantity and an execution sequence are not limited. It should also be understood that although the terms such as first and second are used in the following description to describe various elements, these elements should not be limited by the terms. These terms are merely used to distinguish one element from another element. For example, without departing from the scope of the various examples, a first image may also be referred to as a second image, and similarly, a second image may also be referred to as a first image. Both the first image and the second image may be images, and in some cases, may be separate and different images.

It should further be understood that sequence identifications of the foregoing processes do not mean execution sequences in various embodiments of this application. The execution sequences of the processes should be determined according to functions and internal logic of the processes, and should not be construed as any limitation on the implementation processes of the embodiments of this application.

It should further be understood that the term "includes" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should further be understood that "one embodiment", "an embodiment", or "a possible implementation" mentioned throughout this specification means that particular features, structures, or characteristics related to the embodiments are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments by using any appropriate manner.

Finally, it should be noted that the foregoing embodiments are merely intended for describing the technical solutions of this application other than limiting this application. Although this application is described in detail with reference to the foregoing embodiments, the persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A data processing method, comprising:

sending, by a network interface card of a first device, a request packet to a second device, wherein the request packet is used to request to read data stored in a destination storage area of the second device;

receiving, by the network interface card, a response packet that is sent by the second device in response to the request packet, wherein the response packet comprises the data; and initiating, by the network interface card based on the response packet, direct memory access to a storage address to write the data into a memory area to which the storage address points, wherein the memory area to which the storage address points belongs to a memory area of a host of the first device, the response packet comprises a virtual machine memory identification that points to a corresponding memory area configured by the host for the virtual machine included in the memory area to which the storage address points, the request packet comprises the virtual machine memory identification, the request packet and the response packet each comprise a virtual machine memory identification field, and the virtual machine memory identification is set in the virtual machine memory identification field, the virtual machine memory identification field in the request packet is obtained by occupying at least a portion of a local permission L_key field of the request packet, at least a portion of a length field of the request packet, or at least a portion of an address field of the request packet, and the virtual machine memory identification field in the response packet is obtained by occupying at least a portion of a remote permission R_key field of the response packet, at least a portion of a length field of the response packet, or at least a portion of an address field of the response packet.

2. The method according to claim 1, wherein the initiating, by the network interface card based on the response packet, the direct memory access to the storage address to write the data into the memory area to which the storage address points is based on the virtual machine memory identification.

3. The method according to claim 2, wherein before the writing, by the network interface card, the data into the memory area to which the storage address points, the method further comprises:

finding, by the network interface card by using the virtual machine memory identification as an index, that the memory area to which the storage address points is in an address range included in an address permission table in which the network interface card has permission to initiate the direct memory access.

4. The method according to claim 1, wherein the virtual machine memory identification field in the request packet is obtained by occupying the local permission L_key field of the request packet, and the L_key is a permission identifier used by the network interface card to perform the direct memory access on a memory of the host, and the virtual machine memory identification field in the response packet is obtained by occupying the remote permission R_key field of the response packet, and the R_key is a permission identifier used by a network interface card of the second device to perform remote access on the memory of the host.

5. The method according to claim 1, wherein the virtual machine memory identification field in the request packet is obtained by occupying some bytes in the length field of the request packet and the length field of the response packet, and bytes in the length field other than bytes in the length field occupied by the virtual machine memory identification field are used to store length values of memory blocks comprised in the memory area to which the storage address points, or the virtual machine memory identification field in the response packet is obtained by occupying some bytes in the address field of the request packet and the address field of the response packet, and bytes in the address field other than bytes in the address field occupied by the virtual machine memory identification field are used to store values of start addresses of memory blocks comprised in the memory area to which the storage address points.

6. The method according to claim 1, wherein the virtual machine memory identification field in the request packet is obtained by occupying some bytes in the local permission L_key field of the request packet, and bytes in the L_key field other than bytes in the L_key field occupied by the virtual machine memory identification field are used to store a permission identifier used by the network interface card to perform the direct memory access on the memory area to which the storage address points, and the virtual machine memory identification field in the response packet is obtained by occupying some bytes in the remote permission R_key field of the response packet, and bytes in the R_key field other than bytes in the R_key field occupied by the virtual machine memory identification field are used to store a permission identifier used by a network interface card of the second device to perform remote access on the memory area to which the storage address points.

7. A data processing method, comprising:

sending, by a network interface card of a first device, a request packet to a second device, wherein the request packet is used to request to write data into a destination storage area of the second device, the data is stored in a memory area to which a storage address points, and the memory area to which the storage address points belongs to a memory area of a host of the first device;

receiving, by the network interface card, a response packet that is sent by the second device in response to the request packet, wherein the response packet comprises the storage address;

initiating, by the network interface card based on the response packet, direct memory access to the storage address to read the data; and sending, by the network interface card, the read data to the second device, wherein the response packet comprises a virtual machine memory identification that points to a corresponding memory area configured by the host for the virtual machine included in the memory area to which the storage address points, the request packet comprises the virtual machine memory identification, the request packet and the response packet each comprise a virtual machine memory identification field, and the virtual machine memory identification is set in the virtual machine memory identification field, the virtual machine memory identification field in the request packet is obtained by occupying a local permission L_key field of the request packet, and the L_key is a permission identifier used by the network interface card to perform the direct memory access on a memory of the host, and the virtual machine memory identification field in the response packet is obtained by occupying a remote permission R_key field of the response packet, and the R_key is a permission identifier used by a network interface card of the second device to perform remote access on the virtual machine memory identification.

8. The method according to claim 7, wherein the initiating, by the network interface card is based on the response packet, the direct memory access to the storage address to read the data is based on the virtual machine memory identification.

9. The method according to claim 8, wherein before the initiating, by the network interface card based on the virtual machine memory identification, the direct memory access to the storage address in the memory area to read the data, the method further comprises:

finding, by the network interface card by using the virtual machine memory identification as an index, that the memory area to which the storage address points is in an address range comprised in an address permission table in which the network interface card has permission to initiate the direct memory access.

10. A network interface card of a first device, wherein the network interface card comprises a processor, a receiving interface, a sending interface, and a memory, the memory is configured to store a computer program and data, and the processor is configured to execute the computer program to:

send a request packet to a second device, wherein the request packet is used to request to read data, and the data is stored in a destination storage area of the second device;

receive a response packet that is sent by the second device in response to the request packet, wherein the response packet comprises the data; and initiate, based on the response packet, direct memory access to a storage address to write the data into a memory area to which the storage address points, wherein the memory area to which the storage address points belongs to a memory area of a host of the first device, the response packet comprises a virtual machine memory identification that points to a corresponding memory area configured by the host for the virtual machine included in the memory area to which the storage address points, the request packet comprises the virtual machine memory identification, the request packet and the response packet each comprise a virtual machine memory identification field, and the virtual machine memory identification is set in the virtual machine memory identification field, the virtual machine memory identification field in the request packet is obtained by occupying at least a portion of a local permission L_key field of the request packet, at least a portion of a length field of the request packet, or at least a portion of an address field of the request packet, and the virtual machine memory identification field in the response packet is obtained by occupying at least a portion of a remote permission R_key field of the response packet, at least a portion of a length field of the response packet, or at least a portion of an address field of the response packet.

11. The network interface card according to claim 10, wherein the processor is further configured to:

initiate, the direct memory access to the storage address in the memory area to write the data into the memory area to which the storage address points based on the virtual machine memory identification.

12. The network interface card according to claim 11, wherein the processor further configured to:

find, by using the virtual machine memory identification as an index, that the memory area to which the storage address points is in an address range comprised in an address permission table in which the network interface card has permission to initiate the direct memory access.

13. The network interface card according to claim 10, wherein the virtual machine memory identification field in the request packet is obtained by occupying the local permission L_key field of the request packet, and the L_key is a permission identifier used by the network interface card to perform the direct memory access on a memory of the host, and the virtual machine memory identification field in the response packet is obtained by occupying the remote permission R_key field of the response packet, and the R_key is a permission identifier used by a network interface card of the second device to perform remote access on the memory of the host.

14. The network interface card according to claim 10, wherein the virtual machine memory identification field in the request packet is obtained by occupying some bytes in the length field of the request packet and the length field of the response packet, and bytes in the length field other than bytes in the length field occupied by the virtual machine memory identification field are used to store length values of memory blocks comprised in the memory area to which the storage address points, or the virtual machine memory identification field in the response packet is obtained by occupying some bytes in the address field of the request packet and the address field of the response packet, and bytes in the address field other than bytes in the address field occupied by the virtual machine memory identification field are used to store values of start addresses of memory blocks comprised in the memory area to which the storage address points.

15. The network interface card according to claim 10, wherein the virtual machine memory identification field in the request packet is obtained by occupying some bytes in the local permission L_key field of the request packet, and bytes in the L_key field other than bytes in the L_key field occupied by the virtual machine memory identification field are used to store a permission identifier used by the network interface card to perform the direct memory access on the memory area to which the storage address points; and the virtual machine memory identification field in the response packet is obtained by occupying some bytes in the remote permission R_key field of the response packet, and bytes in the R_key field other than bytes in the R_key field occupied by the virtual machine memory identification field are used to store a permission identifier used by a network interface card of the second device to perform remote access on the memory area to which the storage address points.

16. A network interface card of a first device, wherein the network interface card comprises a processor, a receiving interface, a sending interface, and a memory, the memory is configured to store a computer program and data, and the processor is configured to execute the computer program to:

send a request packet to a second device, wherein the request packet is used to request to write data into a destination storage area of the second device, the data is stored in a memory area to which a storage address points, and the memory area to which the storage address points belongs to a memory area of a host of the first device;

receive a response packet that is sent by the second device in response to the request packet, wherein the response packet comprises the storage address;

initiate, based on the response packet, direct memory access to the storage address to read the data; and send the read data to the second device, wherein the response packet comprises a virtual machine memory identification that points to a corresponding memory area configured by the host for the virtual machine included in the memory area to which the storage address points, the request packet comprises the virtual machine memory identification, and the request packet and the response packet each comprise a virtual machine memory identification field, and the virtual machine memory identification is set in the virtual machine memory identification field, the virtual machine memory identification field in the request packet is obtained by occupying a local permission L_key field of the request packet, and the L_key is a permission identifier used by the network interface card to perform the direct memory access on a memory of the host, and the virtual machine memory identification field in the response packet is obtained by occupying a remote permission R_key field of the response packet, and the R_key is a permission identifier used by a network interface card of the second device to perform remote access on the virtual machine memory identification.

17. The network interface card according to claim 16, the processor is further configured to:

initiate the direct memory access to the storage address in the memory area to read the data based on the virtual machine memory identification.

18. The network interface card according to claim 17, wherein the processor is further configured to:

find, by using the virtual machine memory identification as an index, that the memory area to which the storage address points is in an address range comprised in an address permission table in which the network interface card has permission to initiate the direct memory access.

* * * * *